US010909667B1

(12) United States Patent
Tighe et al.

(10) Patent No.: US 10,909,667 B1
(45) Date of Patent: *Feb. 2, 2021

(54) IMAGE RECTIFICATION USING TRANSFORMATION DATA

(71) Applicant: AMAZON TECHNOLOGIES, INC., Seattle, WA (US)

(72) Inventors: Joseph Patrick Tighe, Seattle, WA (US); Vuong Van Le, Seattle, WA (US); Gerard Guy Medioni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/222,795

(22) Filed: Dec. 17, 2018

Related U.S. Application Data

(63) Continuation of application No. 14/868,272, filed on Sep. 28, 2015, now Pat. No. 10,157,452.

(51) Int. Cl.
| | |
|---|---|
| *G06K 9/00* | (2006.01) |
| *G06T 5/00* | (2006.01) |
| *G06K 9/36* | (2006.01) |
| *G06T 5/40* | (2006.01) |
| *G06T 3/00* | (2006.01) |

(52) U.S. Cl.
CPC .......... *G06T 5/006* (2013.01); *G06K 9/00771* (2013.01); *G06K 9/36* (2013.01); *G06T 3/00* (2013.01); *G06T 5/40* (2013.01); *G06K 2009/363* (2013.01); *G06T 2207/20076* (2013.01); *G06T 2207/20084* (2013.01);
(Continued)

(58) Field of Classification Search
CPC .. G06T 5/006; G06T 5/40; G06T 3/00; G06T 7/004; G06T 2207/30232; G06T 2207/20076; G06T 2207/20084; G06T 2207/30242; G06K 9/36; G06K 9/00771; G06K 2009/363
See application file for complete search history.

(56) References Cited

U.S. PATENT DOCUMENTS

| | | | | |
|---|---|---|---|---|
| 5,548,357 | A | * | 8/1996 | Appel .................. G03B 21/132 353/69 |
| 6,449,004 | B1 | * | 9/2002 | Okisu .................... H04N 5/217 348/44 |

(Continued)

OTHER PUBLICATIONS

Asthana, "An Indoor Wireless System for Personalized Shopping Assistance", CiteSeerX, In Proceedings of IEEE Workshop on Mobile Computing Systems and Applications, 1994, 6 pages.

(Continued)

*Primary Examiner* — Aaron W Carter
(74) *Attorney, Agent, or Firm* — Lindauer Law, PLLC

(57) ABSTRACT

Image data representative of an inventory location may be acquired by cameras. Described are techniques to process such image data to remove one or more perspective effects. For example, transformation data that corresponds to the inventory location may first be determined. Such transformation data is determined based on associations between points in a common plane and alternate points in a virtual camera plane. Transformed image data may then be generated by applying the transformation data to the image data that is representative of the inventory location.

20 Claims, 11 Drawing Sheets

(52) U.S. Cl.
CPC .............. *G06T 2207/30232* (2013.01); *G06T 2207/30242* (2013.01)

(56) References Cited

U.S. PATENT DOCUMENTS

| | | | |
|---|---|---|---|
| 6,778,207 B1* | 8/2004 | Lee | H04N 5/23238 348/36 |
| 6,975,352 B2* | 12/2005 | Seeger | H04N 5/232123 348/218.1 |
| 7,225,980 B2 | 6/2007 | Ku et al. | |
| 7,773,799 B2 | 8/2010 | Oldroyd | |
| 7,949,568 B2 | 5/2011 | Fano et al. | |
| 8,009,864 B2 | 8/2011 | Linaker et al. | |
| 8,107,722 B2 | 1/2012 | Oldroyd | |
| 8,189,855 B2 | 5/2012 | Opalach et al. | |
| 8,630,924 B2 | 1/2014 | Groenevelt et al. | |
| 8,660,355 B2 | 2/2014 | Rodriguez et al. | |
| 9,229,540 B2 | 1/2016 | Mandella et al. | |
| 9,235,928 B2 | 1/2016 | Medioni et al. | |
| 9,424,482 B2* | 8/2016 | Patel | G06K 9/4604 |
| 9,996,818 B1 | 6/2018 | Ren | G06F 16/5866 |
| 10,044,985 B1* | 8/2018 | Parker | H04N 7/18 |
| 10,147,210 B1* | 12/2018 | Desai | G06T 11/60 |
| 10,157,452 B1* | 12/2018 | Tighe | G06T 5/006 |
| 10,169,660 B1* | 1/2019 | Ren | G06K 9/00771 |
| 10,169,677 B1* | 1/2019 | Ren | G06K 9/6212 |
| 10,318,917 B1* | 6/2019 | Goldstein | G06Q 20/208 |
| 10,332,066 B1* | 6/2019 | Palaniappan | G01G 19/42 |
| 10,339,411 B1* | 7/2019 | Hua | G06F 16/532 |
| 10,339,656 B1* | 7/2019 | Le | G06T 7/0042 |
| 10,384,869 B1* | 8/2019 | Shiee | G06Q 10/087 |
| 10,504,230 B1* | 12/2019 | Stahl | G06Q 10/087 |
| 2002/0041717 A1* | 4/2002 | Murata | G06T 5/006 382/275 |
| 2002/0143672 A1 | 10/2002 | Sawasaki | |
| 2008/0043113 A1 | 2/2008 | Ishii | |
| 2009/0326850 A1 | 12/2009 | Ohta | |
| 2010/0225761 A1 | 9/2010 | Ishii | |
| 2010/0245578 A1 | 9/2010 | Kakinami | |
| 2011/0011936 A1 | 1/2011 | Morandi et al. | |
| 2011/0026771 A1 | 2/2011 | Hsu et al. | |
| 2012/0284132 A1 | 11/2012 | Kim et al. | |
| 2012/0327238 A1 | 12/2012 | Satoh | |
| 2013/0284806 A1 | 10/2013 | Margalit | |
| 2014/0111648 A1 | 4/2014 | Ishimoto | |
| 2014/0152774 A1 | 6/2014 | Wakabayashi et al. | |
| 2014/0152827 A1 | 6/2014 | Yamamoto et al. | |
| 2014/0240520 A1 | 8/2014 | Liu et al. | |
| 2014/0340489 A1* | 11/2014 | Medioni | G06T 7/75 348/50 |
| 2015/0086107 A1 | 3/2015 | Dedeoglu et al. | |
| 2015/0116494 A1 | 4/2015 | Esaka et al. | |
| 2015/0117760 A1* | 4/2015 | Wang | G06K 9/66 382/157 |
| 2015/0262116 A1 | 9/2015 | Katircioglu et al. | |
| 2016/0119587 A1 | 4/2016 | Tan et al. | |
| 2016/0203377 A1 | 7/2016 | Irie et al. | |
| 2016/0205319 A1 | 7/2016 | Oota et al. | |
| 2016/0217625 A1* | 7/2016 | Oba | G06T 3/4038 |
| 2016/0361567 A1* | 12/2016 | Chappelow | A61N 5/1045 |
| 2016/0361568 A1* | 12/2016 | Chappelow | G06T 7/0012 |
| 2017/0025008 A1 | 1/2017 | Gignac et al. | |
| 2017/0032194 A1* | 2/2017 | Yu | G06T 7/248 |
| 2017/0178301 A1* | 6/2017 | Moraleda | G06T 7/62 |

OTHER PUBLICATIONS

Carter, Aaron W., "Non-Final Office Action dated Feb. 16, 2018", U.S. Appl. No. 14/868,272, The United States Patent and Trademark Office, dated Feb. 16, 2018.

Chang, et al., "LIBSVM: A Library for Support Vector Machines", Department of Computer Science, National Taiwan University, Taipei, Taiwan, Initial Version: 2001. Last Updated: Mar. 4, 2013, 39 pages. Retrieved from Internet: URL: http://www.csie.ntu.edu.tw/-cjlin/papers/libsvm.pdf.

Corke, Peter, "Machine Vision Toolbox for MATLAB", Release 3.4, Jan. 2015, 242 pages. Retrieved from Internet: URL: http://www.petercorke.com/MVTB/vision.pdf.

Dalal, et al., "Histograms of Oriented Gradients for Human Detection", France, 2005, 8 pages. Retrieved from Internet: URL: http://lear.inrialpes.fr/people/triggs/pubs/Dalal-cvpr05.pdf.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_supermarkets.

Pop, Cristian, "Introduction to the BodyCom Technology", AN1391, DS01391A, Microchip Technology, Inc., May 2, 2011, 26 pages.

Vu, et al. "Distinguishing Users with Capacitive Touch Communication", WINLAB, Rutgers University, In proceedings of: The 18th Annual International Conference on Mobile Computing and Networking ('MobiCom '12), Istanbul, Turkey, Aug. 22-26, 2012, 12 pages.

Do, Anh Hong, "Non-Final Office Action dated Sep. 20, 2016", U.S. Appl. No. 14/868,272, The United States Patent and Trademark Office, dated Sep. 20, 2016.

Do, Anh Hong, "Notice of Allowance dated Jun. 22, 2016", U.S. Appl. No. 14/868,272, The United States Patent and Trademark Office, dated Jun. 22, 2016.

Carter, Aaron W., "Notice of Allowance dated Jul. 24, 2018", U.S. Appl. No. 14/868,272, The United States Patent and Trademark Office, dated Jul. 24, 2018.

Do, Anh Hong, "Notice of Allowance dated Aug. 3, 2017", U.S. Appl. No. 14/868,272, The United States Patent and Trademark Office, dated Aug. 3, 2017.

* cited by examiner

IMAGE RECTIFICATION USING TRANSFORMATION DATA

PRIORITY

This application is a continuation of, and claims priority to, U.S. patent application Ser. No. 14/868,272, filed on Sep. 28, 2015 and published as U.S. Pat. No. 10,157,452, entitled "Image Processing System For Image Rectification," which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor a quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
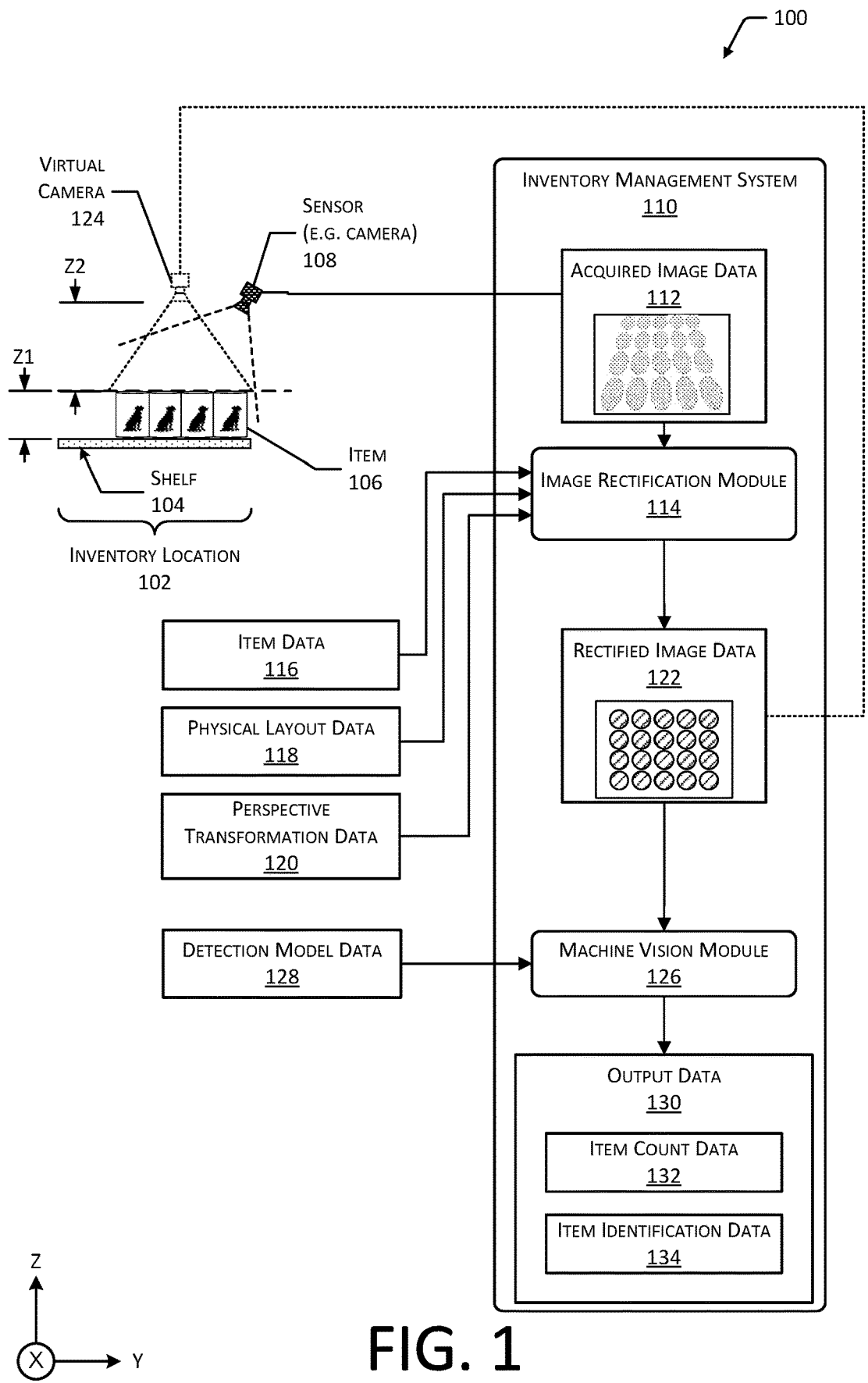
FIG. 1 illustrates an image processing system to generate rectified image data from acquired image data and use the rectified image data to determine output data such as a count of items at an inventory location, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for processing image data acquired from cameras to determine output data, such as identifying or counting items stowed at an inventory location in a materials handling facility (facility) or in other settings. This output data may be used to determine occurrence of, and information about, interactions with the items. For example, interactions may comprise the user picking an item from an inventory location, placing an item at an inventory location, and so forth.

The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth.

Operation of the facility may be facilitated by using one or more sensors to acquire information about interactions in the facility. The inventory management system may process the sensor data from the one or more sensors to determine interaction data. For example, the inventory management system may use the interaction data to determine a type of item a user picked from a particular inventory location, to adjust the count of inventory stowed at the particular inventory location, and so forth.

Traditional machine vision systems to recognize items in images taken at an oblique angle may rely on various techniques to deal with the foreshortening effect produced by the oblique angle. For example, because of the foreshortening effect, items close to the camera appear larger than those farther away. Also, the apparent shape of the items may be skewed or distorted, such as a rectangular box top appearing to be a trapezoid or a cylindrical can appearing as an ellipse. One technique to deal with the different apparent sizes is to process the same image data looking for different scales of the item being sought. For example, to test for 100 different possible apparent sizes, the image may be processed 100 different times, each time looking for a particular apparent size (or scale) of the item. These techniques are resource intensive, utilizing significant amounts of processor time, memory, and so forth.

Described in this application are techniques for processing acquired image data from sensors, such as cameras that are viewing the inventory location at an oblique angle, to produce rectified image data. The rectified image data may be generated by "warping" or rectifying the acquired image data such that the rectified image data appears to be obtained from a camera that is directly overhead of the inventory location, looking down. As a result of the image rectification process, the tops of items in the inventory location that are at the same height and are of the same type (thus having the same physical dimensions) appear in the rectified image to be of the same size, such as in terms of pixels.

With the rectified image data presenting the same type of item at the same size (or scale), subsequent processing using machine vision techniques may omit those extensive iterations. Returning to the example above, given the use of the rectified image data, the machine vision techniques may process the rectified image data once, looking for the item in the rectified image data at a single scale. As a result, significant reductions in resource use such as processor time and memory may be realized. These reductions may allow for various benefits including, but not limited to, reduced allocation of processing hardware to maintain the same throughput, increased rate at which output data is generated, and so forth.

The image rectification process may utilize perspective transformation data to map or associate coordinates of pixels in the acquired image data to new coordinates in the rectified image data. In some implementations, the perspective transformation data may comprise a 3×3 homography matrix. The image rectification process may be dependent on a relative height of the items, or a distance between the camera and the items in the acquired image data. For example, if the camera is very close to the tops of the items at the inventory location, the image will appear different from when the camera is farther from the tops of the items due to perspective effects. The relative height of the items may be described using an item plane.

The item plane may be defined that extends across the top of the items stowed at the inventory location. Where the items at the inventory location are rigid and otherwise of the same type, the item plane may be parallel to the plane of a shelf of the inventory location that is supporting the items. The height of the item plane above the shelf may vary, such as for items of different heights or when items are stacked atop one another.

For a particular height relative to the shelf or the camera, particular perspective transformation data may be generated. For example, at the height of a row of individual but otherwise identical cans of pet food, first perspective transformation data may be stored that associates coordinates in a first item plane defined by the tops of those cans to new coordinates in the rectified image data. If a can of pet food is stacked atop another can with the resulting top at a second height, that portion of the rectified image data will appear distorted, as the particular perspective transformation data is no longer appropriate to the second height. In the situation where a homography is used for this association, the homography assumes that all points are in the same plane. As a result, points (and thus pixels at those points) that are not in the same plane are mapped to coordinates that make the resulting rectified image appear distorted.

From a library of perspective transformation data, a particular set of perspective transformation data may be selected in various fashions as described herein. In one implementation, item data may be accessed that indicates a particular type of item is stowed at a particular inventory location that is imaged by a particular camera. A height of the particular type of item may be retrieved from the item data, and this height may be used to select particular perspective transformation data appropriate to that height above the shelf or distance from the camera.

In another implementation, selection of the perspective transformation data may utilize a plurality of sets of different perspective transformation data that are used to generate a plurality of rectified images. The rectified images may be processed to determine a count of similar polygons appearing in those rectified images. An assumption may be made that the correct rectified image to use is that which has the greatest number of polygons that have a similar size and shape. The rectified image exhibiting the greatest count of similar polygons, the fewest number of different sized polygons, and so forth, may be designated as the rectified image to use for subsequent machine vision processing.

The perspective transformation data may be generated based on information known about the facility or from calibration. For example, given the known physical size of shelving, cameras, configuration of camera mounting brackets, and so forth, the perspective transformation data may be calculated. In another example, a planar target may be temporarily placed at the inventory location, such as atop the items stowed there and used to generate the perspective transformation data for storage and later use.

The machine vision module may process the rectified image data to generate output data. For example, the machine vision module may utilize a convolutional neural network to count items in the rectified image data. In another example, a histogram of oriented gradients (HOG) algorithm may be used to determine the features of items in the rectified image data, and those features may be classified using a support vector machine (SVM). Once classified, the items may be counted, and the count may be used to generate the output data.

By generating the rectified image data, subsequent processing may be simplified, such as avoiding the need to look for items at different scales or performing other computationally intensive operations on image data. By using the techniques described herein, operation of the facility may be improved. Details about interactions between users and items in the facility may be quickly and accurately determined. For example, as items are picked, placed, and so forth, information such as inventory levels based on changes in the count of items at the inventory locations may be readily determined. As a result, the inventory management system may be able to quickly track what item a user has interacted with, maintain up-to-date item data, and so forth.

Illustrative System

FIG. 1 illustrates an image processing system 100. An inventory location 102, such as a shelf 104, is configured to stow some quantity of items 106. In some implementations, a particular portion of an inventory location 102, such as lane upon the shelf 104, may store a particular type of item 106. For example, a first lane on the shelf 104 may store boxes of cat food while a second lane on the shelf 104 may store cans of dog food. A sensor 108, such as a camera, may be positioned to gather information about the inventory location 102. An inventory management system 110 may access acquired image data 112 generated by the sensor 108. The inventory management system 110 may be configured, as described below, to perform various functions such as tracking changes to a quantity on hand of the items 106 at the inventory location 102 based on sensor data provided by the sensors 108.

The inventory management system 110 may include or have access to an image rectification module 114. The image rectification module 114 may access information including, but not limited to, item data 116, physical layout data 118, perspective transformation data 120, or other information.

The item data 116 provides information about a particular type of item 106, including characteristics of that type of item 106 such as physical dimensions, where that type of item 106 is located in the facility, and so forth. For example, the item data 116 may indicate the types and quantities of items 106 that are expected to be stored at that particular inventory location 102 such as in a particular lane on a shelf 104, height of that type of item 106, weight of the item 106 individually or in aggregate, and so forth. The item data 116 is described in more detail below with regard to FIG. 7.

The physical layout data 118 may provide information indicative of where sensors 108 and inventory locations 102 are in the facility with respect to one another, direction the sensor 108 is oriented relative to the inventory location 102, and so forth. For example, the physical layout data 118 may indicate that camera 108(1)(1) is positioned at a front of inventory location 102(37) and pointed such that a centerline of a field-of-view of the camera 108(1)(1) is looking toward the back of the inventory location 102(37) and angled 30 degrees below horizontal. The physical layout data 118 is described in more detail below with regard to FIG. 7.

The perspective transformation data 120 provides data indicative of an association between a first set of coordinates in the acquired image data 112 to a second set of coordinates that are used to generate the rectified image data 122. The rectified image data 122 may be generated by "warping" or rectifying the acquired image data 112 such that the rectified image data 122 appears to be obtained from a virtual camera that is directly overhead of the inventory location 102, looking down. As a result of the image rectification process, the tops of items 106 in the inventory location 102 that are at the same height and are of the same type (thus having the same physical dimensions) appear in the rectified image data 122 to be of the same size in terms of pixels. In some implementations, the perspective transformation data 120 may comprise a matrix that is based on an assumption that a plurality of pixels in the acquired image data 112 is located within a common plane. For example, homography techniques may be used to generate the perspective transformation data 120. In one implementation, the findHomography function of OpenCV may be utilized to generate a homography matrix. The matrix thus provides a mapping that associates points on the common plane with points on a camera plane of the sensor 108. The generation of perspective transformation data 120 is described in more detail below.

In one implementation where the sensor 108 comprises a camera 108(1), the homography may be determined using data about camera calibration and the techniques associated with a pinhole camera model. An actual camera perspective projection may be determined using the following equation:

$$\begin{pmatrix} u \\ v \\ 1 \end{pmatrix} = KRt \begin{pmatrix} x \\ y \\ z \\ 1 \end{pmatrix} \quad \text{Equation 1}$$

In equation 1, K represents an actual intrinsic camera matrix, also known as an intrinsic matrix. The intrinsic camera matrix is indicative of intrinsic parameters of the camera. These intrinsic parameters may include focal length, image sensor format, principal point, and so forth. Rt is pose matrix from shelf to camera. The terms x, y, z are representative of coordinates in three-dimensional space of a point on top of the item 106. These coordinates may be expressed in values relative to a particular lane or portion of the shelf 104.

The items 106 may be stacked one atop another on the shelf 104. The z value may have possible stacked heights that can be expressed as a product z=n*h, with n=1, 2, 3, . . . , k. Based at least in part on this stack ability, Equation 1 may be reduced to 3×3=3×3*3×1 and is shown as Equation 2.

$$\begin{pmatrix} u \\ v \\ 1 \end{pmatrix} = A \begin{pmatrix} x \\ y \\ 1 \end{pmatrix} \quad \text{Equation 2}$$

The coordinate system of the virtual camera 124 may be defined with an origin at a corner of the lane on the shelf 104, with x and y directions matched with the shelf 104. Given these assumptions, orthogonal projection reduces to a scale factor:

$$\begin{pmatrix} i \\ j \\ 1 \end{pmatrix} = s \begin{pmatrix} x \\ y \\ 1 \end{pmatrix} \quad \text{Equation 3}$$

From equations 2 and 3, the homography "H" may be generated.

$$H = sA^{-1} \quad \text{Equation 4}$$

The s factor in equation 3 may be used to describe a correspondence between pixels in an image and a linear measurement in an object. For example, the s factor may be indicative of a relationship that 20 pixels correspond to 30 millimeters at the inventory location 102.

Due to apparent changes in perspective, differences in the distance between the sensor 108 and the common plane result in different mappings. As a result, first perspective transformation data 120(1) associated with a first common plane having a first height above the shelf 104 may have different values and thus provide a different mapping compared to second perspective transformation data 120(2) associated with a second common plane having a second height above the shelf 104 that is greater than the first height.

The image rectification module 114 may use the acquired image data 112 as input to select perspective transformation data 120 to use in generating rectified image data 122. The rectified image data 122 may be described in some implementations as a warping or transformation of a relative position of pixels in the acquired image data 112 to simulate an image acquired from a virtual camera 124 that is directly overhead of the inventory location 102 and looking down. For example, the acquired image data 112 may include images of the items 106 that are foreshortened due to the oblique angle of the sensor 108 with respect to the shelf 104. Continuing the example, the rectified image data 122 presents an image of the tops of the items 106 that is not foreshortened, such that the apparent size within the image of each of the items 106 that are of the same type (and thus of the same physical dimensions on the shelf 104) are approximately the same.

As a result of the warping of the acquired image data 112 as provided by the image rectification module 114, the rectified image data 122 may be provided to a machine vision module 126 or other module for subsequent processing. For example, the machine vision module 126 may be configured to identify or count the number of the items 106 in the rectified image data 122. Because the tops of the items 106 in the rectified image data 122 are of a common scaling (such that items 106 of the same physical dimensions have the same apparent size), the machine vision module 126 need not utilize techniques that are resource intensive to look for a given item 106 at different scales, such as ranging from very small when distant from the sensor 108 to very large when close to the sensor 108.

In some implementations, the machine vision module 126 may access detection model data 128 to generate output data 130. The detection model data 128 may be used to recognize or distinguish between individual items 106. For example, the machine vision module 126 may utilize a convolutional neural network (CNN) to detect individual items 106 in the rectified image data 122. The convolutional neural network may have been trained using rectified image data 122. As a result of the image rectification process, the relative sizes of the individual tops of the type of item 106 in the rectified image data 122 are within a threshold size of one another. The image rectification process thus allows the detection model data 128 to be suitable for use at a single size scaling. For example, the diameter of the top of the cans of pet food in the rectified image data 122 may be within 1% of one another having the same apparent size in the rectified image data 122. As a result, the detection model data 128 may only be trained for a single size, such as for the item 106 having a diameter of 300 pixels, rather than being trained for a variety of different apparent sizes due to perspective effects.

In other implementations, other types of techniques may be used to determine the presence of an item 106 as represented within the rectified image data 122. For example, a HOG algorithm, a second order function (SOF) algorithm, a SVM, and so forth, may be utilized to process the rectified image data 122 and generate data indicative of one or more features in the rectified image data 122. The HOG algorithm may be preferred in situations where the items 106 are relatively rigid and maintain a reasonably consistent shape overtime. For example, where the item 106 comprises a rigid container, such as a steel can, the rectified image data 122 may be processed using a HOG algorithm to detect one or more occurrences of the type of item 106 in the rectified image data 122. The HOG algorithm may be implemented by using the HOGDescriptor function of OpenCV. The HOGDescriptor function utilizes an implementation of the HOG algorithm described in "Histograms of Oriented Gradients for Human Detection" by Navneet Dalal and Bill Triggs. The techniques described by Dalal and Triggs may be applied to non-human detection, such as the items 106. In some implementations, different techniques may be combined. For example, the HOG algorithm may be used to determine features, which may then be classified using an SVM. For example, the CvSVM functions of OpenCV may be utilized. The data indicative of the one or more features as produced by the HOG algorithm may be processed by the SVM to generate data indicative of a presence of at least one item 106 or a portion thereof, such as a top of an item 106. For example, the SVM may be used to recognize that a type of item 106, or portion thereof, is present in the rectified image data 122.

The SVM may be trained, such as by using the CvSVM:: train function of OpenCV. Additional details regarding SVMs may be found at "LIBSVM: A Library for Support Vector Machines" by Chih-Chung Chang and Chih-Jen Lin. Once the items 106 in the rectified image data 122 have been classified or recognized as being a particular type of item 106, the number of occurrences may be counted by the machine vision module 126 and used to generate the output data 130.

The output data 130 may result from processing of the rectified image data 122 by the machine vision module 126. For example, the output data 130 may comprise one or more of item count data 132 or item identification data 134. The item count data 132 may comprise data indicative of a quantity of items 106 at the inventory location 102 or at a portion of the inventory location 102. In some implementations, the item count data 132 may be specific to a particular type of item 106, the item count data 132 may be a count of items 106 of different types, a count of the different types of items 106 that are depicted, and so forth. The item identification data 134 may comprise information indicative of a particular type of item 106. For example, the item identification data 134 may indicate that a particular item 106 in the rectified image data 122 is a particular type of pet food, based at least in part on the appearance of the item 106 in the rectified image data 122.

As described below in more detail with regard to FIG. 6, the inventory management system 110 may utilize the output data 130 to generate interaction data. For example, item count data 132 may be determined based on acquired image data 112 acquired before and after the user approaches the inventory location 102. The items 106 appearing in the corresponding rectified image data 122 for the before-and-after images may be counted to generate before item count data 132 and after item count data 132. By subtracting the value of the before item count data 132 from the after item count data 132, a differential indicative of a quantity of items 106 picked may be determined. This information may be used by the inventory management system 110 to adjust the quantity of the items 106 on hand at the inventory location 102.

Figure 2:
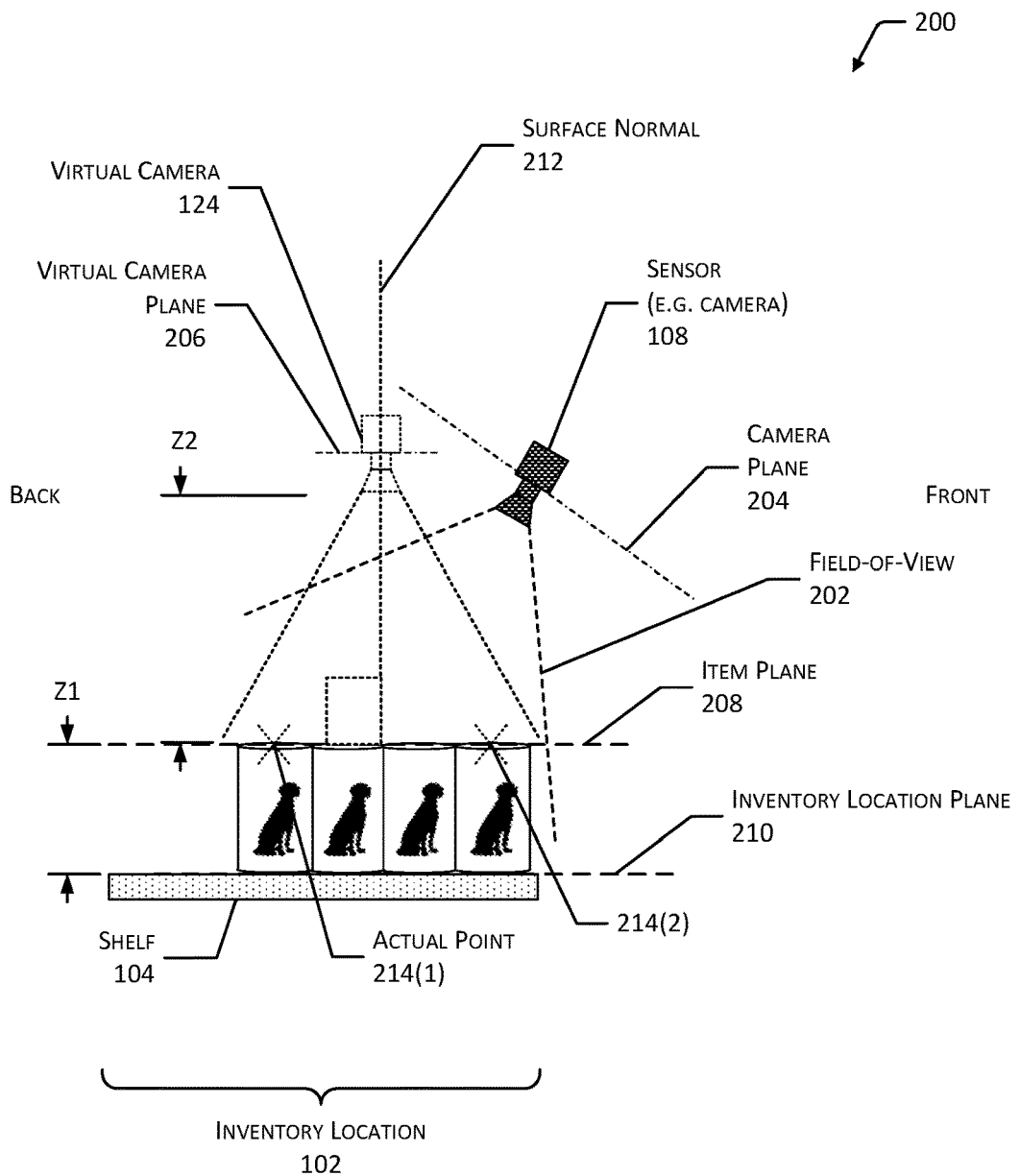
FIG. 2 illustrates a side view of an inventory location and a relative position and direction of a camera relative to the inventory location, according to some implementations.
Figure 2:
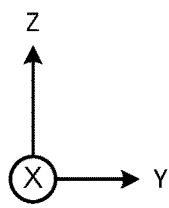

FIG. 2 illustrates a side view 200 of an inventory location 102 comprising a shelf 104 and a relative position and direction of a sensor 108 (such as a camera) with respect to the shelf 104, according to some implementations. As illustrated here, the sensor 108 is positioned proximate to a front of the shelf 104 and above the shelf 104. The sensor 108 may be fixedly mounted to a support structure above the inventory location 102 and proximate to a front of the inventory location 102. The sensor 108 exhibits a field-of-view (FOV) 202. The sensor 108 in this figure is directed such that a centerline of the FOV 202 is pointed at a generally oblique angle relative to the shelf 104, downward and toward a back of the shelf 104.

The sensor 108 includes a camera plane 204. The camera plane 204 may comprise a plane within which the acquired image data 112 exists. For example, the camera plane 204 may comprise a plane extending through the charge coupled device (CCD) or complementary metal oxide semiconductor (CMOS) image sensor within the sensor 108. In some implementations, the centerline of the FOV 202 of the sensor 108 may be a surface normal 212 relative to, and centered within, the camera plane 204.

As described above, the rectified image data 122 may appear to have been acquired by the virtual camera 124. The virtual camera 124 may have a virtual camera plane 206 that is similar to the camera plane 204 of the sensor 108. The virtual camera 124 may have an effective height of Z2 above the items 106.

An item plane 208 may be defined by a series of points on the items 106. These points used to define the item plane 208 may, in some implementations, be those points or features on the items 106 that are uppermost with respect to the shelf 104. For example, where the items 106 comprise cans of identical size and shape, the item plane 208 may comprise a plane extending through the upper lids of those cans. The item plane 208 is positioned at a height Z1 relative to the shelf 104. An inventory location plane 210 extends through a surface of the shelf 104. In implementations where the inventory location 102 comprises hangers, the inventory location plane 210 may extend through other points corresponding to the suspended items 106. In a situation where the items 106 are of otherwise identical in size and shape, the item plane 208 and the inventory location plane 210 may be substantially parallel with respect to one another.

The location of the virtual camera 124 may be described in some implementations as having the virtual camera plane 206 of the virtual camera 124 positioned above the item plane 208. The virtual camera plane 206 may be centered on a surface normal 212 extending from one or more of the item plane 208 or the inventory location plane 210. The surface normal 212 is a line that is orthogonal to a plane from which it originates, such as the item plane 208 or the inventory location plane 210. In some implementations, the surface normal 212 may extend from a midpoint between a portion of the front and back of the shelf 104 that is able to stow items 106.

In some implementations, the item plane 208 may extend through a plurality of actual points 214 that are the uppermost portion of the items 106. For example, the actual points 214 through which the item plane 208 extends may be the uppermost points of the cans of pet food which are sitting on top of the shelf 104.

The image rectification module 114 uses the perspective transformation data 120 as described above to map points in the item plane 208 to corresponding points in the virtual camera plane 206 to produce the rectified image data 122. The resulting rectified image data 122 appears to be an image for which at least that portion within the item plane 208, appears to have been acquired by the virtual camera 124. Objects that appear in portions of the image that are not within the item plane 208 may be distorted from their actual appearance.

Figure 3:
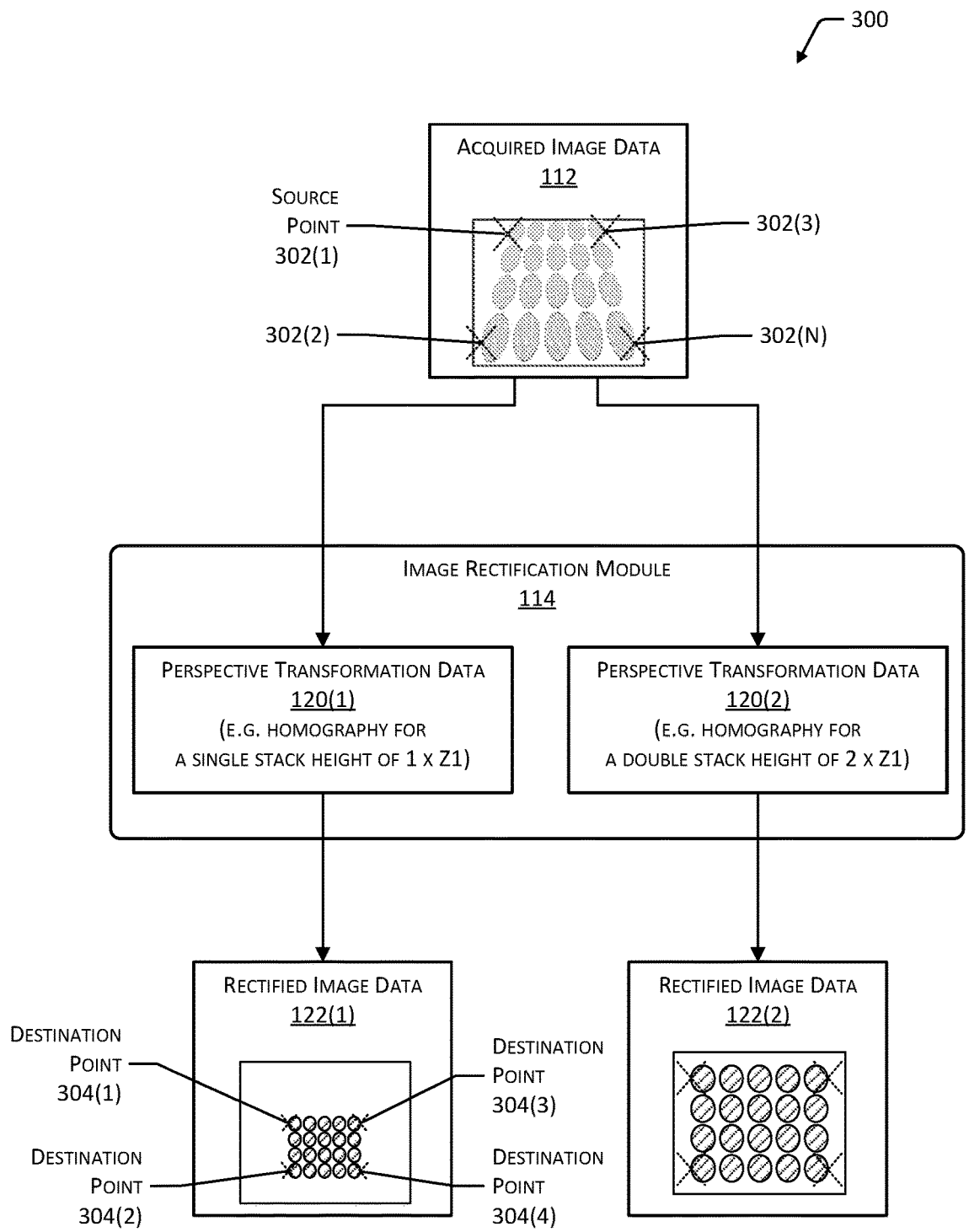
FIG. 3 illustrates processing of acquired image data using perspective transformation data to generate rectified image data, according to some implementations.

FIG. 3 illustrates a scenario 300 of processing the acquired image data 112 using perspective transformation data 120 to generate rectified image data 122. The acquired image data 112 is representative of a two-dimensional array of image elements, or pixels. Each pixel may have one or more value indicative of color, hue, brightness, luminance, and so forth. Each pixel, in turn, is associated with a particular set of coordinates within the array. For example, the pixel at coordinates (201, 473) in the acquired image data 112 may have a red value of 251, green value of 197, and blue value of 101.

For ease of illustration, and not necessarily as a limitation, source points 302(1), 302(2), . . . , 302(N) are depicted in the acquired image data 112, indicated by crosshairs. The source points 302 may comprise points that are within a plane in the physical world, such as the actual points 214 that reside in the item plane 208. The image rectification module 114 may select a particular set of perspective transformation data 120 for use from a plurality of sets of perspective transformation data 120. The selection of the perspective transformation data 120 may be based on one or more factors. In some implementations, the selection may be based at least in part on the height of the item plane 208. For example, item data 116 may be accessed to determine what type of items 106 are designated to be stowed at a particular inventory location 102. Based on that determination, information about that type of item 106 may be retrieved, such as a height Z1 of an individual item 106.

In some implementations, items 106 may be stacked one atop each other. For example, cans of pet food may be stacked two high. The image rectification module 114 may be configured to select perspective transformation data 120 associated with integer multiples of the height Z1 of an individual item 106. For example, the image rectification module 114 may select first perspective transformation data 120(1) that has an item plane 208 at Z1 and also may select a second perspective transformation data 120(2) that has an item plane 208 at twice Z1. In some implementations, small variations in height may be tolerated. For example, the item height Z1 may be a minimum, maximum, or average height of items 106 that may experience some variability in their respective heights.

The perspective transformation data 120 may be selected based on height of a plane in which actual points 214 reside, such as the item plane 208 at height Z1. The height Z1 may be for a height that most closely corresponds to, but may not be identical to, height Z1. For example, the perspective transformation data 120 may be an item plane 208 at height of 135 millimeter (mm) while the actual height Z1 of the items 106 may be 132 mm. In some implementations, different sets of perspective transformation data 120 may be generated at regular height intervals. For example, perspective transformation data 120 may be generated for heights at 5 mm increments, such as for item planes 208 at heights 5 mm, 10 mm, 15 mm, . . . , 135 mm, and so forth, up to a maximum height.

The perspective transformation data 120 may be determined based on a calculation using previously acquired information, experimentally from acquisition of actual data, or a combination of the two. In one implementation, the physical layout data 118 may provide information such as the physical dimensions of the inventory location 102, extrinsic parameters about the sensor 108 such as relative position with respect to the inventory location 102, direction of the sensor 108, and so forth. Information about the sensor 108 may be accessed. For example, intrinsic parameters descriptive of the optical system of the camera may be retrieved from a lookup table. By using at least a portion of this information, the perspective transformation data 120 may be calculated.

In another implementation, the perspective transformation data 120 may be determined experimentally. For example, a planar target may be placed at a known height at the inventory location 102, and acquired calibration image data may be obtained. The calibration image data may comprise image data of the planar target. Given the known height and the knowledge that points on the planar target are in the same plane, the perspective transformation data 120 be determined. In some implementations, the planar target may comprise known fiducials or features that may be detected automatically, such as crosshairs located at the corners of the planar target, a "checkerboard" square grid pattern, and so forth. In one implementation, the planar target may comprise a sheet of material such as cardboard or plastic that is placed atop the items 106 resting on the shelf 104. In some implementations, one or more features on the planar target may have a particular or known size. Based on this information and the intrinsic parameters of the sensor 108, a distance from the sensor 108 to the planar target may be determined. Based on this knowledge and previously stored information indicating the position of the sensor 108 relative to the inventory location 102, the height of the planar target may be determined.

In some situations, the perspective transformation data 120 may be determined based on experimentally acquired calibration image data obtained at particular heights, and intermediate heights may be interpolated. For example, the planar target may be placed at 10 mm increments of height such as at 10 mm, 20 mm, 30 mm, and so forth, and acquired calibration image data may be obtained and processed to determine the perspective transformation data 120. Perspective transformation data 120 corresponding to 5 mm increments, such as at heights of 15 mm, 25 mm, and 35 mm may be interpolated from the perspective transformation data 120 or other experimental data obtained at the 10 mm increments.

Experimental determination of the perspective transformation data 120 may be performed without the use of a planar target. For example, one or more of the machine vision module 126 or a human operator may select source points 302 in acquired image data 112 and designate the actual location of destination points 304, from which the perspective transformation data 120 may be obtained.

The image rectification module 114 may utilize various transform functions to map pixels from a first set of coordinates in the acquired image data 112 to a second set of coordinates in the rectified image data 122. In one implementation, the transform function may comprise a warp that uses a homography. The homography provides a relationship between points located in a first plane to points within a second plane, using a 3×3 matrix. The homography is computationally inexpensive to generate. In operation, the homography assumes that the input and the output are of points that are each in their respective planes. For example, all of the points in the acquired image data 112 are assumed to be in the same item plane 208. As a result of this assumption, portions of the items 106 or other objects that are above or below the item plane 208 may experience distortion relative to the actual appearance of the portions of the items 106 or other objects. However, the portion of those items 106 that are within the item plane 208, for which the homography has been generated, have the same scale in the rectified image data 122. For example, where the items 106 comprise pet food cans that are substantially the same size and shape, the tops of the cans that are within the item plane 208 will all appear to have substantially the same diameter when measured as pixels within the rectified image data 122. As a result, the rectified image data 122 may more easily be processed by the machine vision module 126, without having to contend with scale issues that occur in a foreshortened image. These scale issues may be visible in the acquired image data 112 where the otherwise physically identical items appear to have different sizes or shapes in the image.

The transform of the acquired image data 112 may be performed, at least in part, using one or more tools available in the OpenCV library as developed by Intel Corporation of Santa Clara, Calif., USA; MATLAB as developed by MathWorks, Inc. of Natick, Mass., USA; and so forth. For example, the OpenCV function "findHomography" may be used to generate the homography. Continuing the example, in the OpenCV environment, the "warpPerspective" function may be used apply the homography to warp or transform the acquired image data 112 to form the rectified image data 122. In another example, in the MATLAB environment, the "HOMOGRAPHY_SOLVE" function may be used to generate a homography. Continuing this example, the "HOMWARP" function developed by Peter I. Corke and part of the Machine Vision Toolbox for Matlab (MVTB) may be utilized to apply the homography to warp or transform the acquired image data 112 to form the rectified image data 122.

After the application of the perspective transformation data 120, the same actual point 214 that is represented in both the acquired image data 112 as the source point 302 and the rectified image data 122 as a destination point 304 may be displaced or offset. For example, the first actual point 214(1) is represented in the acquired image data 112 as the first source point 302(1) at a first set of coordinates, and is transformed as the first destination point 304(1) at a second set of coordinates. For some parts of the rectified image data 122, the first set of coordinates and the second set of coordinates may have the same values. However, for other parts of the same rectified image data 122, as a result of the application of the perspective transformation data 120, the first set of coordinates and the second set of coordinates may have different values.

Figure 4:
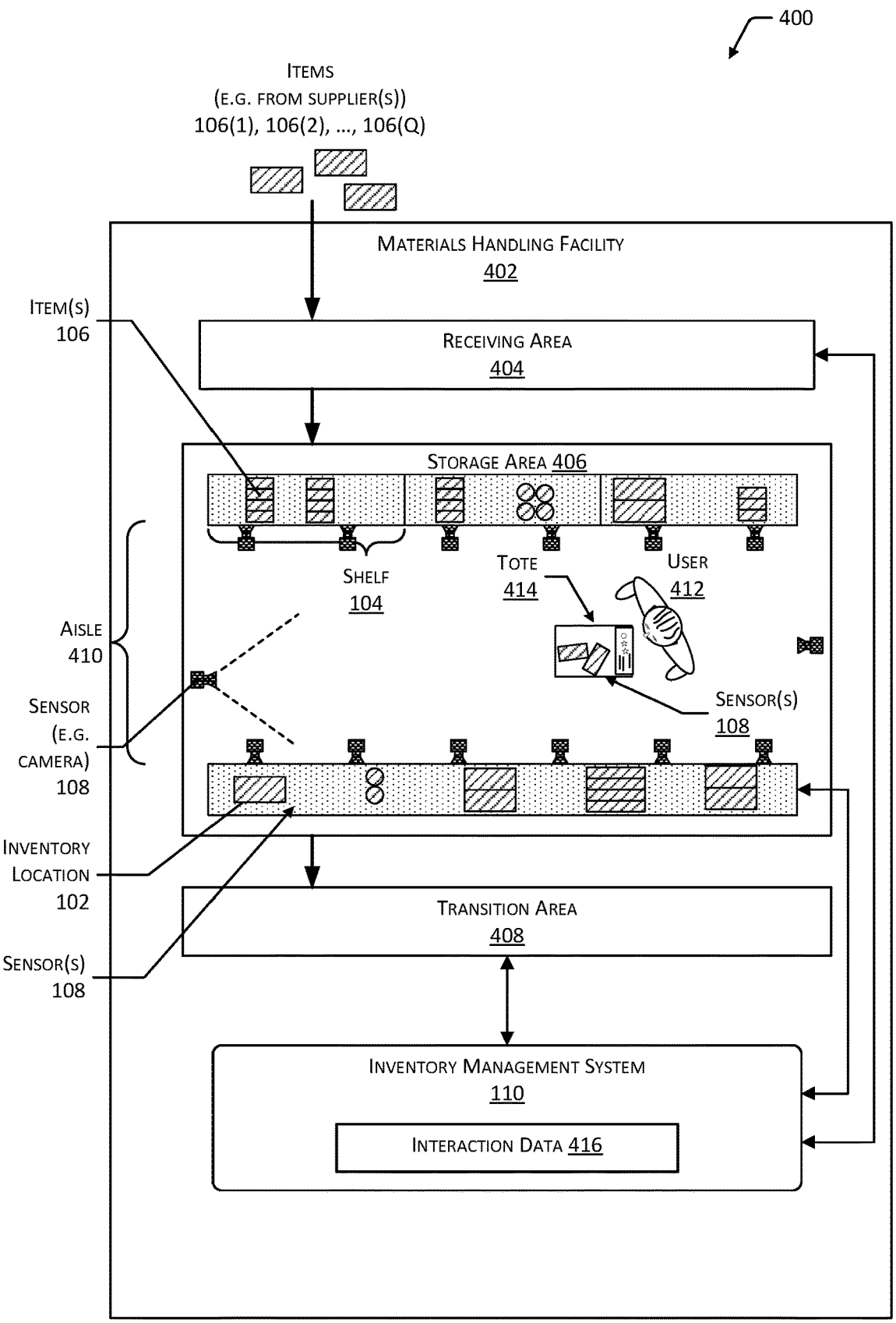
FIG. 4 is a block diagram illustrating a materials handling facility (facility) using the image processing system, according to some implementations.

FIG. 4 is a block diagram 400 illustrating a materials handling facility (facility) 402 using the image processing system 100, according to some implementations. A facility 402 comprises one or more physical structures or areas within which one or more items 106(1), 106(2), . . . , 106(Q) may be held. As used in this disclosure, letters in parenthesis such as "(Q)" indicate an integer value greater than or equal to zero. The items 106 comprise physical goods, such as books, pharmaceuticals, repair parts, electronic gear, and so forth.

The facility 402 may include one or more areas designated for different functions with regard to inventory handling. In this illustration, the facility 402 includes a receiving area 404, a storage area 406, and a transition area 408.

The receiving area 404 may be configured to accept items 106, such as from suppliers, for intake into the facility 402. For example, the receiving area 404 may include a loading dock at which trucks or other freight conveyances unload the items 106.

The storage area 406 is configured to store the items 106. The storage area 406 may be arranged in various physical configurations. In one implementation, the storage area 406 may include one or more aisles 410. The aisle 410 may be configured with, or defined by, inventory locations 102 on one or both sides of the aisle 410. The inventory locations 102 may include one or more of a shelf 104, a rack, a case, a cabinet, a bin, a floor location, or other suitable storage mechanisms for holding, supporting, or storing the items 106. The inventory locations 102 may be affixed to the floor or another portion of the structure of the facility 402. The inventory locations 102 may also be movable such that the arrangements of aisles 410 may be reconfigurable. In some implementations, the inventory locations 102 may be configured to move independently of an outside operator. For example, the inventory locations 102 may comprise a rack with a power source and a motor, operable by a computing device to allow the rack to move from one location within the facility 402 to another.

One or more users 412 and totes 414 or other material handling apparatus may move within the facility 402. For example, the user 412 may move about within the facility 402 to pick or place the items 106 in various inventory locations 102, placing them on the tote 414 for ease of transport. The tote 414 is configured to carry or otherwise transport one or more items 106. For example, the tote 414 may include a basket, cart, bag, bin, and so forth. In other implementations, other material handling apparatuses such as robots, forklifts, cranes, aerial drones, and so forth, may move about the facility 402 picking, placing, or otherwise moving the items 106. For example, a robot may pick an item 106 from a first inventory location 102(1) and move the item 106 to a second inventory location 102(2).

One or more sensors 108 may be configured to acquire information in the facility 402. The sensors 108 may include, but are not limited to, cameras 108(1), depth sensors 108(2), weight sensors 108(6), optical sensor arrays 108(13), proximity sensors 108(14), and so forth. The sensors 108 may be stationary or mobile, relative to the facility 402. For example, the inventory locations 102 may contain weight sensors 108(6) to acquire weight sensor data of items 106 stowed therein, cameras 108(1) to acquire images of picking or placement of items 106 on shelves 104, optical sensor arrays 108(13) to detect shadows of the user's 412 hands at the inventory locations 102, and so forth. In another example, the facility 402 may include cameras 108(1) to obtain images of the user 412 or other objects in the facility 402. The sensors 108 are discussed in more detail below with regard to FIG. 5.

While the storage area 406 is depicted as having one or more aisles 410, inventory locations 102 storing the items 106, sensors 108, and so forth, it is understood that the receiving area 404, the transition area 408, or other areas of the facility 402 may be similarly equipped. Furthermore, the arrangement of the various areas within the facility 402 is depicted functionally rather than schematically. For example, in some implementations, multiple different receiving areas 404, storage areas 406, and transition areas 408 may be interspersed rather than segregated in the facility 402.

The facility 402 may include, or be coupled to, an inventory management system 110. The inventory management system 110 is configured to interact with users 412 or devices such as sensors 108, robots, material handling equipment, computing devices, and so forth, in one or more of the receiving area 404, the storage area 406, or the transition area 408.

During operation of the facility 402, the sensors 108 may be configured to provide sensor data, or information based on the sensor data, to the inventory management system 110. The sensor data may include acquired image data 112, non-image data, weight sensor data obtained from weight sensors 108(6), and so forth. The sensors 108 are described in more detail below with regard to FIG. 5.

The inventory management system 110 or other systems may use the sensor data to track the location of objects within the facility 402, movement of the objects, or provide other functionality. Objects may include, but are not limited to, items 106, users 412, totes 414, and so forth. For example, a series of images acquired by the camera 108(1) may indicate removal by the user 412 of an item 106 from a particular location on the inventory location 102 and placement of the item 106 on or at least partially within the tote 414.

The facility 402 may be configured to receive different kinds of items 106 from various suppliers and to store them until a customer orders or retrieves one or more of the items 106. A general flow of items 106 through the facility 402 is indicated by the arrows of FIG. 4. Specifically, as illustrated in this example, items 106 may be received from one or more suppliers, such as manufacturers, distributors, wholesalers, and so forth, at the receiving area 404. In various implementations, the items 106 may include merchandise, commodities, perishables, or any suitable type of item 106, depending on the nature of the enterprise that operates the facility 402.

Upon being received from a supplier at the receiving area 404, the items 106 may be prepared for storage in the storage area 406. For example, in some implementations, items 106 may be unpacked or otherwise rearranged. The inventory management system 110 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 404, items 106 may be stored within the storage area 406. In some implementations, like items 106 may be stored or displayed together in the inventory locations 102 such as in bins, on shelves 104, hanging from pegboards, and so forth. In this implementation, all items 106 of a given kind are stored in one inventory location 102. In other implementations, like items 106 may be stored in different inventory locations 102. For example, to optimize retrieval of certain items 106 having frequent turnover within a large physical facility 402, those items 106 may be stored in several different inventory locations 102 to reduce congestion that might occur at a single inventory location 102.

When a customer order specifying one or more items 106 is received, or as a user 412 progresses through the facility 402, the corresponding items 106 may be selected or "picked" from the inventory locations 102 containing those items 106. In various implementations, item picking may range from manual to completely automated picking. For example, in one implementation, a user 412 may have a list of items 106 they desire and may progress through the facility 402 picking items 106 from inventory locations 102 within the storage area 406 and placing those items 106 into a tote 414. In other implementations, employees of the facility 402 may pick items 106 using written or electronic pick lists derived from customer orders. These picked items 106 may be placed into the tote 414 as the employee progresses through the facility 402.

After items 106 have been picked, the items 106 may be processed at a transition area 408. The transition area 408 may be any designated area within the facility 402 where items 106 are transitioned from one location to another or from one entity to another. For example, the transition area 408 may be a packing station within the facility 402. When the item 106 arrives at the transition area 408, the items 106 may be transitioned from the storage area 406 to the packing station. Information about the transition may be maintained by the inventory management system 110.

In another example, if the items 106 are departing the facility 402, a list of the items 106 may be obtained and used by the inventory management system 110 to transition responsibility for, or custody of, the items 106 from the facility 402 to another entity. For example, a carrier may accept the items 106 for transport with that carrier accepting responsibility for the items 106 indicated in the list. In another example, a user 412 may purchase or rent the items 106 and remove the items 106 from the facility 402. During use of the facility 402, the user 412 may move about the facility 402 to perform various tasks, such as picking or placing the items 106 in the inventory locations 102.

To facilitate operation of the facility 402, the inventory management system 110 is configured to use the sensor data including the acquired image data 112 and other information such as the item data 116, the physical layout data 118, the perspective transformation data 120, the detection model data 128, and so forth, to generate interaction data 416. For example, the rectified image data 122 may be used to determine a count of items 106 on hand at a particular inventory location 102 at a first time and a second time. A change in the count may be used to determine a pick or a place of items 106.

The interaction data 416 may provide information about an interaction, such as a pick of an item 106 from the inventory location 102, a place of an item 106 to the inventory location 102, a touch made to an item 106 at the inventory location 102, a gesture associated with an item 106 at the inventory location 102, and so forth. The interaction data 416 may include one or more of the type of interaction, interaction location identifier indicative of where from the inventory location 102 the interaction took place, item identifier, quantity change to the item 106, user identifier, and so forth. The interaction data 416 may then be used to further update the item data 116. For example, the quantity of items 106 on hand at a particular lane on the shelf 104 may be changed based on an interaction that picks or places one or more items 106.

In some implementations, a single inventory location 102 such as a shelf 104 may stow several different types of items 106, with each type of item 106 arranged in columns on the shelf 104. The inventory management system 110 may use the rectified image data 122 to count the items 106, identify the items 106, and so forth. The physical layout data 118 may be used to associate a particular sensor 108 with a particular inventory location 102, or portion thereof such as a lane.

The inventory management system 110 may combine or otherwise utilize data from different sensors 108 of different types. For example, weight data obtained from weight sensors at the inventory location 102 may be used instead of, or in conjunction with, the rectified image data 122 to determine the interaction data 416.

In some implementations, items 106 may be processed, such as at the receiving area 404, to generate at least a portion of the item data 116. For example, an item 106 not previously stored by the inventory management system 110 may be measured to determine geometry such as external dimensions such as height, width, and shape, may be assigned to a particular inventory location 102, and so forth, as part of a process to receive the item 106 into the facility 402. Continuing the example, the item data 116 generated may include acquiring the height Z1 of a single item 106, information about the shape of that item 106 in two or three dimensions, and so forth.

By using the rectified image data 122 the inventory management system 110 may maintain item data 116 such as inventory levels of a particular item 106 at a particular inventory location 102, generate billing information without manual intervention by a user 412, or provide other functions. For example, the user 412 may pick an item 106 from the inventory location 102. Using the interaction data 416 based on the rectified image data 122 and in conjunction with the item data 116, the inventory management system 110 may correctly determine that a quantity of one can of dog food has been picked, and bill the user 412 accordingly for the sale price of the item 106. In some implementations, the rectified image data 122 may be generated using the data from other sensors 108, such as weight sensors 108(6), RFID readers (108)(8), and so forth.

Figure 5:
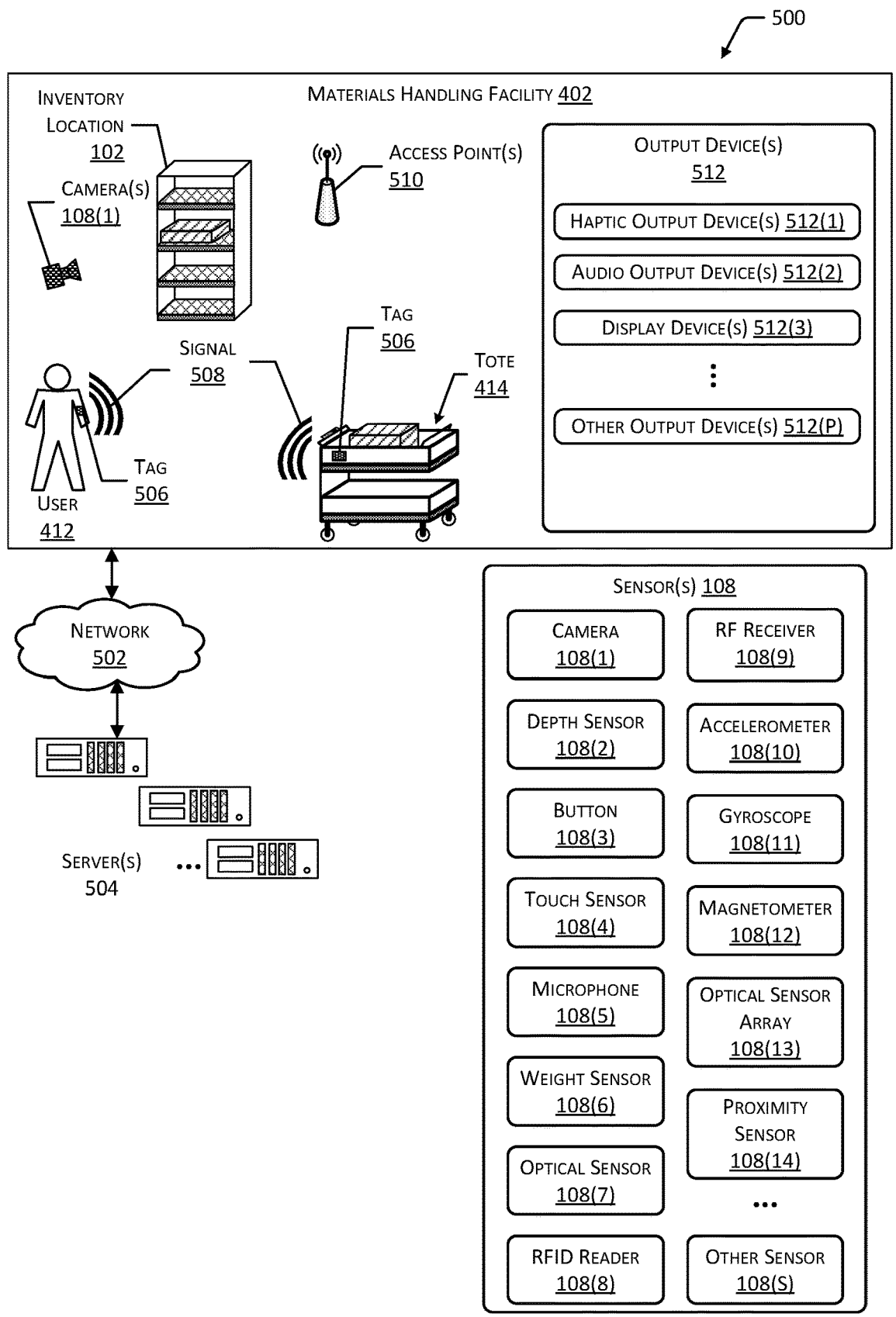
FIG. 5 is a block diagram illustrating additional details of the facility, according to some implementations.

FIG. 5 is a block diagram 500 illustrating additional details of the facility 402, according to some implementations. The facility 402 may be connected to one or more networks 502, which in turn connect to one or more servers 504. The network 502 may include private networks such as an institutional or personal intranet, public networks such as the Internet, or a combination thereof. The network 502 may utilize wired technologies (e.g., wires, fiber optic cables, and so forth), wireless technologies (e.g., radio frequency, infrared, acoustic, optical, and so forth), or other connection technologies. The network 502 is representative of any type of communication network, including one or more of data networks or voice networks. The network 502 may be implemented using wired infrastructure (e.g., copper cable, fiber optic cable, and so forth), a wireless infrastructure (e.g., cellular, microwave, satellite, and so forth), or other connection technologies.

The servers 504 may be configured to execute one or more modules or software applications associated with the inventory management system 110 or other systems. While the servers 504 are illustrated as being in a location outside of the facility 402, in other implementations, at least a portion of the servers 504 may be located at the facility 402. The servers 504 are discussed in more detail below with regard to FIG. 6.

The users 412, the totes 414, or other objects in the facility 402 may be equipped with one or more tags 506. The tags 506 may be configured to emit a signal 508. In one implementation, the tag 506 may be a radio frequency identification (RFID) tag 506 configured to emit an RF signal 508 upon activation by an external signal. For example, the external signal may comprise a radio frequency signal or a magnetic field configured to energize or activate the RFID tag 506. In another implementation, the tag 506 may comprise a transmitter and a power source configured to power the transmitter. For example, the tag 506 may comprise a Bluetooth Low Energy (BLE) transmitter and battery. In other implementations, the tag 506 may use other techniques to indicate presence of the tag 506. For example, an acoustic tag 506 may be configured to generate an ultrasonic signal 508, which is detected by corresponding acoustic receivers. In yet another implementation, the tag 506 may be configured to emit an optical signal 508.

The inventory management system 110 may be configured to use the tags 506 for one or more of identification of the object, determining a location of the object, and so forth. For example, the users 412 may wear tags 506, the totes 414 may have tags 506 affixed, and so forth, which may be read and, based at least in part on signal strength, used to determine identity and location.

Generally, the inventory management system 110 or other systems associated with the facility 402 may include any number and combination of input components, output components, and servers 504.

The one or more sensors 108 may be arranged at one or more locations within the facility 402. For example, the sensors 108 may be mounted on or within a floor, wall, at a ceiling, at an inventory location 102, on a tote 414, may be carried or worn by a user 412, and so forth.

The sensors 108 may include one or more cameras 108(1) or other imaging sensors. The one or more cameras 108(1) may include imaging sensors configured to acquire images of a scene. The cameras 108(1) are configured to detect light in one or more wavelengths including, but not limited to, terahertz, infrared, visible, ultraviolet, and so forth. The cameras 108(1) may comprise charge coupled devices (CCD), complementary metal oxide semiconductor (CMOS) devices, microbolometers, and so forth. The inventory management system 110 may use image data acquired by the cameras 108(1) during operation of the facility 402. For example, the inventory management system 110 may identify items 106, users 412, totes 414, and so forth, based at least in part on their appearance within the image data acquired by the cameras 108(1). The cameras 108(1) may be mounted in various locations within the facility 402. For example, cameras 108(1) may be mounted overhead, on inventory locations 102, may be worn or carried by users 412, may be affixed to totes 414, and so forth.

One or more depth sensors 108(2) may also be included in the sensors 108. The depth sensors 108(2) are configured to acquire spatial or three-dimensional (3D) data, such as depth information, about objects within a FOV 202. The depth sensors 108(2) may include range cameras, lidar systems, sonar systems, radar systems, structured light systems, stereo vision systems, optical interferometry systems, and so forth. The inventory management system 110 may use the 3D data acquired by the depth sensors 108(2) to identify objects, determine a location of an object in 3D real space, and so forth. In some implementations, the depth sensors 108(2) may provide data that is used to generate or select the perspective transformation data 120. For example, the 3D data may be used to determine the height Z1 of the items 106.

One or more buttons 108(3) may be configured to accept input from the user 412. The buttons 108(3) may comprise mechanical, capacitive, optical, or other mechanisms. For example, the buttons 108(3) may comprise mechanical switches configured to accept an applied force from a touch of the user 412 to generate an input signal. The inventory management system 110 may use data from the buttons 108(3) to receive information from the user 412. For example, the tote 414 may be configured with a button 108(3) to accept input from the user 412 and send information indicative of the input to the inventory management system 110.

The sensors 108 may include one or more touch sensors 108(4). The touch sensors 108(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 110 may use data from the touch sensors 108(4) to receive information from the user 412. For example, the touch sensor 108(4) may be integrated with the tote 414 to provide a touchscreen with which the user 412 may select from a menu one or more particular items 106 for picking, enter a manual count of items 106 at an inventory location 102, and so forth.

One or more microphones 108(5) may be configured to acquire information indicative of sound present in the environment. In some implementations, arrays of microphones 108(5) may be used. These arrays may implement beamforming techniques to provide for directionality of gain. The inventory management system 110 may use the one or more microphones 108(5) to acquire information from acoustic tags 506, accept voice input from the users 412, determine ambient noise level, and so forth.

One or more weight sensors 108(6) are configured to measure the weight of a load, such as the item 106, the tote 414, or other objects. The weight sensors 108(6) may be configured to measure the weight of the load at one or more of the inventory locations 102, the tote 414, on the floor of the facility 402, and so forth. For example, the shelf 104 may include a plurality of lanes or platforms, with one or more weight sensors 108(6) beneath each one to provide weight sensor data about an individual lane or platform. The weight sensors 108(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 108(6) may operate as transducers that generate one or more signals based on an applied force, such as that of the load due to gravity. For example, the weight sensor 108(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 108(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 110 may use the data acquired by the weight sensors 108(6) to identify an object, determine a change in the quantity of objects, determine a location of an object, maintain shipping records, and so forth.

The sensors 108 may include one or more optical sensors 108(7). The optical sensors 108(7) may be configured to provide data indicative of one or more of color or intensity of light impinging thereupon. For example, the optical sensor 108(7) may comprise a photodiode and associated circuitry configured to generate a signal or data indicative of an incident flux of photons. As described below, the optical sensor array 108(13) may comprise a plurality of the optical sensors 108(7). For example, the optical sensor array 108(13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 108(7) may be used. The optical sensors 108(7) may be sensitive to one or more of infrared light, visible light, or ultraviolet light. For example, the optical sensors 108(7) may be sensitive to infrared light, and infrared light sources such as LEDs may provide illumination.

The optical sensors 108(7) may include photodiodes, photoresistors, photovoltaic cells, quantum dot photoconductors, bolometers, pyroelectric infrared detectors, and so forth. For example, the optical sensor 108(7) may use germanium photodiodes to detect infrared light.

One or more radio frequency identification (RFID) readers 108(8), near field communication (NFC) systems, and so forth, may be included as sensors 108. For example, the RFID readers 108(8) may be configured to read the RF tags 506. Information acquired by the RFID reader 108(8) may be used by the inventory management system 110 to identify an object associated with the RF tag 506 such as the item 106, the user 412, the tote 414, and so forth. For example, based on information from the RFID readers 108(8) detecting the RF tag 506 at different times and RFID readers 108(8) having different locations in the facility 402, a velocity of the RF tag 506 may be determined.

One or more RF receivers 108(9) may also be included as sensors 108. In some implementations, the RF receivers 108(9) may be part of transceiver assemblies. The RF receivers 108(9) may be configured to acquire RF signals 508 associated with Wi-Fi, Bluetooth, ZigBee, 5G, 4G, 3G, LTE, or other wireless data transmission technologies. The RF receivers 108(9) may provide information associated with data transmitted via radio frequencies, signal strength of RF signals 508, and so forth. For example, information from the RF receivers 108(9) may be used by the inventory management system 110 to determine a location of an RF source, such as a communication interface onboard the tote 414.

The sensors 108 may include one or more accelerometers 108(10), which may be worn or carried by the user 412, mounted to the tote 414, and so forth. The accelerometers 108(10) may provide information such as the direction and magnitude of an imposed acceleration. Data such as rate of acceleration, determination of changes in direction, speed, and so forth, may be determined using the accelerometers 108(10).

A gyroscope 108(11) may provide information indicative of rotation of an object affixed thereto. For example, the tote 414 or other objects may be equipped with a gyroscope 108(11) to provide data indicative of a change in orientation of the object.

A magnetometer 108(12) may be used to determine an orientation by measuring ambient magnetic fields, such as the terrestrial magnetic field. The magnetometer 108(12) may be worn or carried by the user 412, mounted to the tote 414, and so forth. For example, the magnetometer 108(12) mounted to the tote 414 may act as a compass and provide information indicative of which direction the tote 414 is oriented.

An optical sensor array 108(13) may comprise one or more optical sensors 108(7). The optical sensors 108(7) may be arranged in a regular, repeating, or periodic two-dimensional arrangement such as a grid. The optical sensor array 108(13) may generate image data. For example, the optical sensor array 108(13) may be arranged within or below an inventory location 102 and obtain information about shadows of items 106, hand of the user 412, and so forth.

The sensors 108 may include proximity sensors 108(14) used to determine presence of an object, such as the user 412, the tote 414, and so forth. The proximity sensors 108(14) may use optical, electrical, ultrasonic, electromagnetic, or other techniques to determine a presence of an object. In some implementations, the proximity sensors 108(14) may use an optical emitter and an optical detector to determine proximity. For example, an optical emitter may emit light, a portion of which may then be reflected by the object back to the optical detector to provide an indication that the object is proximate to the proximity sensor 108(14). In other implementations, the proximity sensors 108(14) may comprise a capacitive proximity sensor 108(14) configured to provide an electrical field and determine a change in electrical capacitance due to presence or absence of an object within the electrical field.

The proximity sensors 108(14) may be configured to provide sensor data indicative of one or more of a presence or absence of an object, a distance to the object, or characteristics of the object. An optical proximity sensor 108(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 108 such as a camera 108(1). Based on an apparent distance between the features of the structured light pattern, the distance to the object may be calculated. Other techniques may also be used to determine distance to the object. In another example, the color of the reflected light may be used to characterize the object, such as skin, clothing, tote 414, and so forth.

The sensors 108 may include other sensors 108(S) as well. For example, the other sensors 108(S) may include light curtains, ultrasonic rangefinders, thermometers, barometric sensors, hygrometers, and so forth. For example, the inventory management system 110 may use information acquired from thermometers and hygrometers in the facility 402 to direct the user 412 to check on delicate items 106 stored in a particular inventory location 102, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf 104 in front of the inventory location 102, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 412 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 412 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 412 may be used to trigger acquisition or selection of acquired image data 112 for processing by the image rectification module 114 and subsequent processing by the machine vision module 126.

The sensors 108(S) may also include an instrumented auto-facing unit (AFU). The instrumented AFU may comprise a position sensor configured to provide data indicative of displacement of a pusher. As an item 106 is removed from the AFU, the pusher moves, such as under the influence of a spring, and pushes the remaining items 106 in the AFU to the front of the inventory location 102. By using data from the position sensor, and given item data 116 such as a depth of an individual item 106, a count may be determined, based on a change in position data. For example, if each item 106 is 1 inch deep, and the position data indicates a change of 5 inches, the quantity held by the AFU may have changed by 5 items 106. This count information may be used to confirm or provide a cross check for the output data 130.

In some implementations, the camera 108(1) or other sensors 108 may include hardware processors, memory, and other elements configured to perform various functions. For example, the cameras 108(1) may be configured to generate image data, send the image data to another device such as the server 504, and so forth.

The facility 402 may include one or more access points 510 configured to establish one or more wireless networks. The access points 510 may use Wi-Fi, NFC, Bluetooth, or other technologies to establish wireless communications between a device and the network 502. The wireless networks allow the devices to communicate with one or more of the sensors 108, the inventory management system 110, the optical sensor arrays 108(13), the tags 506, a communication device of the tote 414, or other devices.

Output devices 512 may also be provided in the facility 402. The output devices 512 are configured to generate signals, which may be perceived by the user 412 or detected by the sensors 108. In some implementations, the output devices 512 may be used to provide illumination of the optical sensor array 108(13).

Haptic output devices 512(1) are configured to provide a signal that results in a tactile sensation to the user 412. The haptic output devices 512(1) may use one or more mechanisms such as electrical stimulation or mechanical displacement to provide the signal. For example, the haptic output devices 512(1) may be configured to generate a modulated electrical signal, which produces an apparent tactile sensation in one or more fingers of the user 412. In another example, the haptic output devices 512(1) may comprise piezoelectric or rotary motor devices configured to provide a vibration, which may be felt by the user 412.

One or more audio output devices 512(2) may be configured to provide acoustic output. The acoustic output includes one or more of infrasonic sound, audible sound, or ultrasonic sound. The audio output devices 512(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 512(3) may be configured to provide output, which may be seen by the user 412 or detected by a light-sensitive sensor such as a camera 108(1) or an optical sensor 108(7). In some implementations, the display devices 512(3) may be configured to produce output in one or more of infrared, visible, or ultraviolet light. The output may be monochrome or in color. The display devices 512(3) may be one or more of emissive, reflective, microelectromechanical, and so forth. An emissive display device 512(3), such as using LEDs, is configured to emit light during operation. In comparison, a reflective display device 512(3), such as using an electrophoretic element, relies on ambient light to present an image. Backlights or front lights may be used to illuminate non-emissive display devices 512(3) to provide visibility of the output in conditions where the ambient light levels are low.

The display devices 512(3) may be located at various points within the facility 402. For example, the addressable displays may be located on inventory locations 102, totes 414, on the floor of the facility 402, and so forth.

Other output devices 512(P) may also be present. For example, the other output devices 512(P) may include scent/odor dispensers, document printers, 3D printers or fabrication equipment, and so forth.

Figure 6:
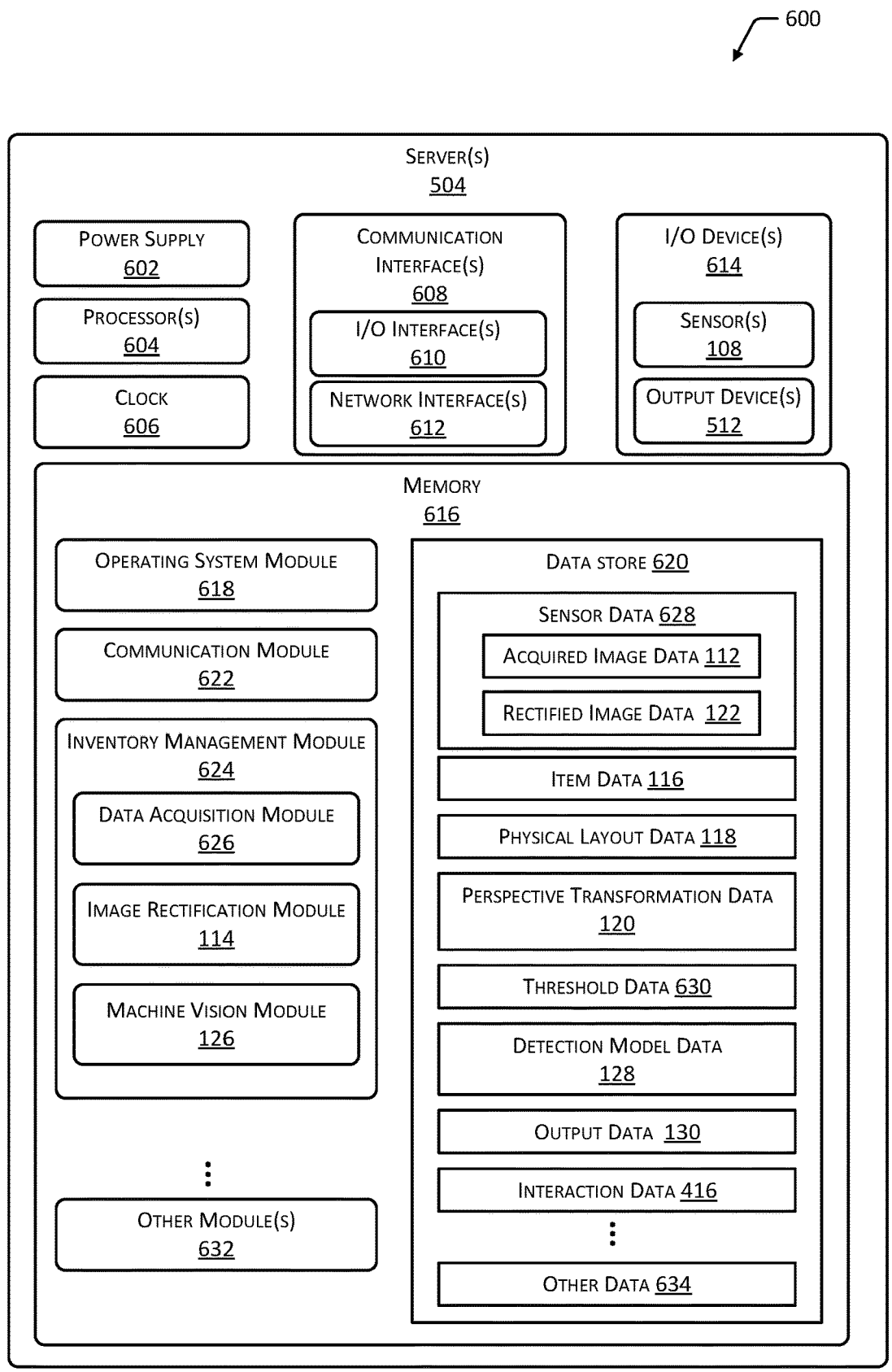
FIG. 6 is a block diagram of a server to support operation of the facility, including the image processing system, according to some implementations.

FIG. 6 illustrates a block diagram 600 of a server 504 configured to support operation of the facility 402, according to some implementations. The server 504 may be physically present at the facility 402, may be accessible by the network 502, or a combination of both. The server 504 does not require end-user knowledge of the physical location and configuration of the system that delivers the services. Common expressions associated with the server 504 may include "on-demand computing", "software as a service (SaaS)", "platform computing", "network-accessible platform", "cloud services", "data centers", and so forth. Services provided by the server 504 may be distributed across one or more physical or virtual devices.

One or more power supplies 602 may be configured to provide electrical power suitable for operating the components in the server 504. The one or more power supplies 602 may comprise batteries, capacitors, fuel cells, photovoltaic cells, wireless power receivers, conductive couplings suitable for attachment to an external power source such as provided by an electric utility, and so forth. The server 504 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The server 504 may include one or more communication interfaces 608 such as input/output (I/O) interfaces 610, network interfaces 612, and so forth. The communication interfaces 608 enable the server 504, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 108, keyboard, mouse, scanner, and so forth. The I/O devices 614 may also include output devices 512 such as one or more of a display device 512(3), printer, audio speakers, and so forth. In some embodiments, the I/O devices 614 may be physically incorporated with the server 504 or may be externally placed.

The network interfaces 612 may be configured to provide communications between the server 504 and other devices, such as the totes 414, routers, access points 510, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The server 504 may also include one or more busses or other internal communications hardware or software that allow for the transfer of data between the various modules and components of the server 504.

As shown in FIG. 6, the server 504 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the server 504. A few example functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including the servers 504, network attached storage devices, and so forth.

A communication module 622 may be configured to establish communications with one or more of the totes 414, sensors 108, display devices 512(3), other servers 504, or other devices. The communications may be authenticated, encrypted, and so forth.

The memory 616 may store an inventory management module 624. The inventory management module 624 is configured to provide the inventory functions as described herein with regard to the inventory management system 110. For example, the inventory management module 624 may track items 106 between different inventory locations 102, to and from the totes 414, and so forth.

The inventory management module 624 may include one or more of a data acquisition module 626, the image rectification module 114, the machine vision module 126, and so forth. The data acquisition module 626 may be configured to acquire and access information associated with operation of the facility 402. For example, the data acquisition module 626 may be configured to acquire sensor data 628 from one or more of the sensors 108.

As described above, the image rectification module 114 may be configured to accept the acquired image data 112 as input and produce the rectified image data 122. The image rectification module 114 may access one or more of the item data 116, the physical layout data 118, the perspective transformation data 120, threshold data 630, and so forth, during operation. The threshold data 630 may comprise one or more thresholds associated with operation of the inventory management module 624. For example, the threshold data 630 may indicate a tolerance or acceptable variation between an actual height Z1 of an item 106 and a particular set of perspective transformation data 120 associated with a slightly different height Z1.

The machine vision module 126, as also described above, may be configured to use the rectified image data 122 to generate output data 130. For example, the rectified image data 122 of a shelf 104 may be processed by the machine vision module 126 to determine item count data 132 indicative of a number of a type of item 106 on the shelf 104.

During operation, the machine vision module 126 may utilize detection model data 128. For example, the detection model data 128, as described above, may comprise a previously trained neural network or settings indicative thereof. In other implementations, the detection model data 128 may comprise previously configured algorithms that have been trained to recognize a particular type of item 106.

The machine vision module 126 may generate the output data 130. For example, the output data 130 may comprise the item count data 132, the item identification data 134, or other information. In some implementations, the inventory management module 624 may utilize the output data 130, or output from other modules, to generate the interaction data 416. The interaction data 416 may then be used to facilitate operation of the facility 402, such as by changing the quantity on hand maintained in the item data 116, issuing an alert for restocking at a particular inventory location 102, and so forth.

Processing of one or more of the acquired image data 112, rectified image data 122, or other image data may be performed by the machine vision module 126 implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 628. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 628 or other data 634. For example, the ANN may be a trained using a supervised learning algorithm such that object identifiers are associated with images of particular objects within training images provided to the ANN. Once trained, the ANN may be provided with the sensor data 628 such as the rectified image data 122.

The machine vision module 126 may process rectified image data 122 using one or more machine vision counting techniques to determine a count of the items 106. For example, machine vision counting techniques may be configured to recognize a top portion of the items 106 in the rectified image data 122. This determination may be based on item data 116, such as previously acquired images of a sampled item 106, or the detection model data 128. Each of the tops of the type of item 106 appearing in the rectified image data 122 may be identified, and a count made. A change in count may be determined based on acquired image data 112 and resultant rectified image data 122 obtained at a first time and a second time, respectively.

In one implementation, the machine vision module 126 uses one or more algorithms to determine the tops of items 106 in the FOV 202. For example, a HOG algorithm may be used to extract the features of the items 106 that appear in the rectified image data 122. An SVM may then be used to classify the extracted features and determine which of the extracted features correspond to items 106. The output data 130 may comprise the resulting count of the items 106 determined by the SVM to be in the rectified image data 122.

In other implementations, the rectified image data 122 allows for less computationally intensive techniques to be utilized. For example, a template matching algorithm may be used to process the rectified image data 122 and determine the presence of an item 106 in the rectified image data 122. Template matching becomes viable in this situation because the rectified image data 122 presents the items 106 at a single scale and with a consistent perspective.

Other modules 632 may also be present in the memory 616 as well as other data 634 in the data store 620. For example, the other modules 632 may include an accounting module while the other data 634 may include billing data. The accounting module may be configured to assess charges to accounts associated with particular users 412 or other entities, while the billing data may include information such as payment account numbers.

Figure 7:
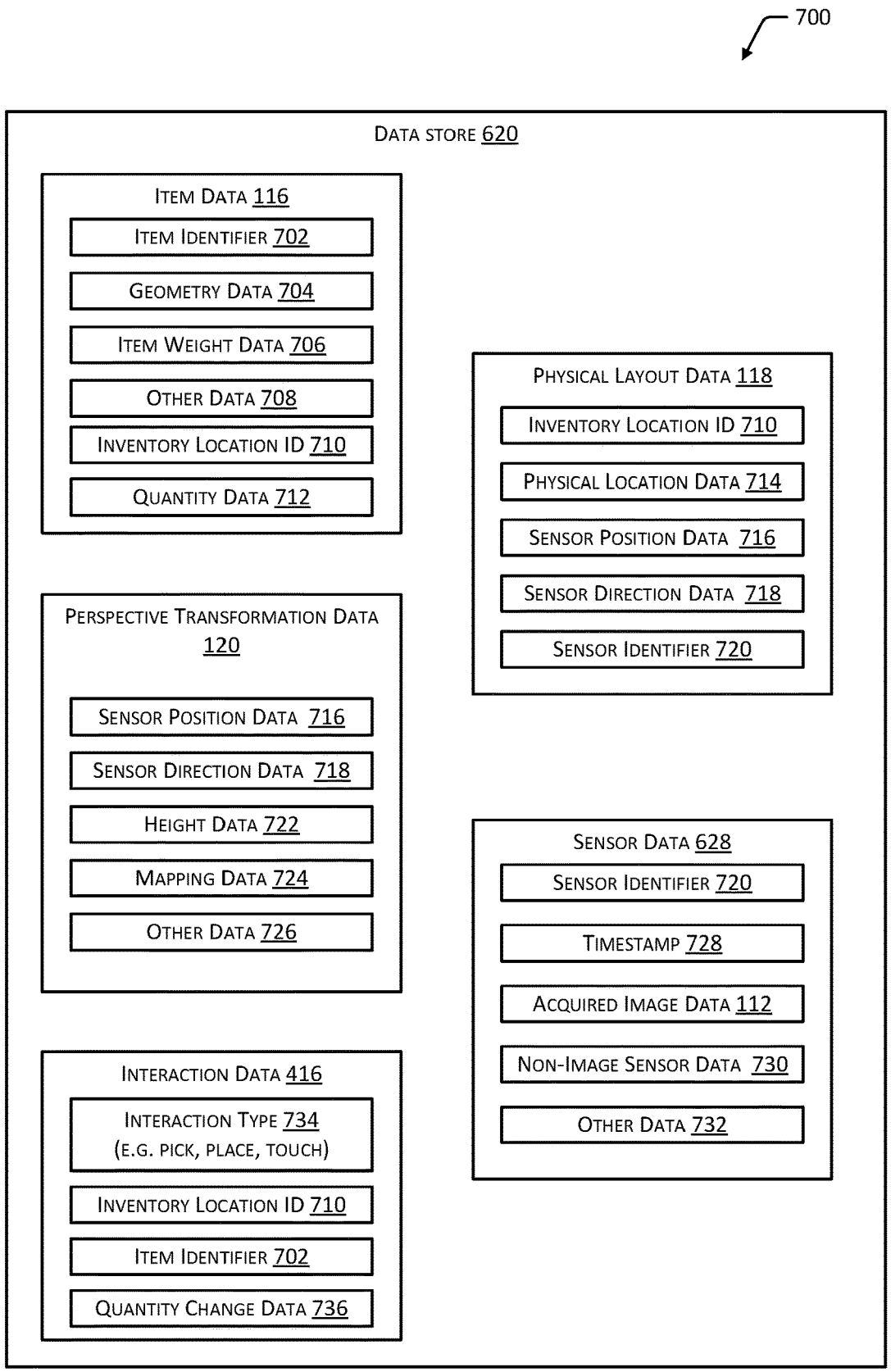
FIG. 7 is a block diagram of additional data that may be used by the server to support operation of the facility, according to some implementations.

FIG. 7 is a block diagram 700 of additional data that may be used by the server 504 to support operation of the facility 402, according to some implementations. This data may be stored at least in part by the data store 620. As described above with regard to FIG. 6, the inventory management module 624 may use the sensor data 628 to generate other information such as interaction data 416 indicative of what item 106 a user 412 has interacted with.

The inventory management module 624 may access the item data 116. The item data 116 may include an item identifier 702. The item identifier 702 may be used to distinguish one type of item 106 from another. For example, the item identifier 702 may include a stock keeping unit (SKU) string, Universal Product Code (UPC) number, and so forth. The items 106 that are of the same type may be referred to by the same item identifier 702. For example, cans of beef flavor Brand X dog food may be represented by the item identifier 702 value of "9811901181". In other implementations, non-fungible items 106 may each be provided with a unique item identifier 702, allowing each to be distinguished from one another.

The item data 116 may include one or more geometry data 704, item weight data 706, or other data 708. The geometry data 704 may include information indicative of size and shape of the item 106 in one, two, or three dimensions. For example, the geometry data 704 may include the overall shape of an item 106, such as a cuboid, sphere, cylinder, and so forth. The geometry data 704 may also include information such as length, width, depth, and so forth, of the item 106. Dimensional information in the geometry data 704 may be measured in pixels, centimeters, inches, arbitrary units, and so forth. The geometry data 704 may be for a single item 106, or a package, kit, or other grouping considered to be a single item 106.

The item weight data 706 comprises information indicative of a weight of a single item 106, or a package, kit, or other grouping considered to be a single item 106. The item data 116 may include other data 708. For example, the other data 708 may comprise weight distribution of the item 106, point cloud data for the item 106, and so forth.

The item data 116 may include one or more inventory location identifiers (IDs) 710. The inventory location ID 710 is indicative of a particular area or volume of an inventory location 102 that is designated for stowage of the type of item 106. For example, a single shelf 104 may be designated as several shelf locations, each with a different inventory location ID 710. Each of the different inventory location IDs 710 may be associated with a particular area on the shelf 104 designated for storage of a particular type of item 106. A single type of item 106 may be associated with a particular inventory location ID 710, a plurality of inventory location IDs 710 may be associated with the single type of item 106, more than one type of item 106 may be associated with the particular inventory location ID 710, and so forth.

The item data 116 may also include quantity data 712. The quantity data 712 may comprise a count or value indicative of a number of items 106. The count may be a measured or an estimated value. The quantity data 712 may be associated with a particular inventory location ID 710, for an entire facility 402, and so forth. For example, the same type of item 106 may be stored at different shelves 104 within the facility 402. The quantity data 712 may indicate the quantity on hand for each of the different inventory locations 102.

The physical layout data 118 may provide information indicative of where sensors 108 and inventory locations 102 are in the facility 402 with respect to one another, direction of the camera 108(1) relative to the inventory location 102, and so forth. For example, the physical layout data 118 may comprise information representative of a map or floor plan of the facility 402 with relative positions of inventory locations 102, planogram data indicative of how items 106 are to be arranged at the inventory locations 102, and so forth.

The physical layout data 118 may associate a particular inventory location ID 710 with other information such as physical location data 714, sensor position data 716, sensor direction data 718, sensor identifiers 720, and so forth. The physical location data 714 provides information about where in the facility 402 objects are, such as the inventory location 102, the sensors 108, and so forth. In some implementations, the physical location data 714 may be relative to another object. For example, the physical location data 714 may indicate that the camera 108(1) is associated with the inventory location 102.

The sensor position data 716 may provide information indicative of a position in space of the sensor 108 with respect to a particular inventory location 102. For example, the sensor position data 716 may provide one or more of a vector value, scalar value along a predetermined direction, set of coordinates, matrix, and so forth, which indicates a position of the sensor 108.

The sensor direction data 718 provides information indicative of an orientation of the sensor 108 with respect to another object or reference point, such as the inventory location 102. For example, the sensor direction data 718 may be indicative of an angle between a centerline of the FOV 202 of the sensor 108 and a reference line, such as local vertical (up and down). The sensor direction data 718 may be specified in units of degrees, radians, as a decimal value, as a matrix, and so forth.

The physical layout data 118 may include a sensor identifier 720. The sensor identifier 720 may be used to associate a particular sensor 108 with a particular location within the facility 402, or to particular fixtures such as an inventory location 102. For example, the physical layout data 118 may associate the first camera 108(1)(1) that has a sensor ID of "09042002" with shelf 104(16) on aisle 410(3).

The data store 620 may store perspective transformation data 120 that includes one or more of sensor position data 716, sensor direction data 718, height data 722, mapping data 724, or other data 726. The mapping data 724 comprises information that describes an association between a first set of coordinates in the acquired image data 112 and a second set of coordinates. For example, the second set of coordinates may describe positions within the virtual camera plane 206. The mapping data 724 may be used by the image rectification module 114 to generate the rectified image data 122. Different mapping data 724 may exist for different combinations of position of the sensor 108 relative to the inventory location 102, pose of the sensor 108 relative to the inventory location 102, height Z1 of the items 106 (if any) at the inventory location 102 as stored in the height data 722, and so forth. For example, a first set of mapping data 724(1) is associated with a first sensor position, a first sensor direction, and a first height. Continuing the example, a second set of mapping data 724(2) that is different from the first set of mapping data 724(1) may be associated with the same first sensor position and first sensor direction but for a second height that is different from the first height.

In some implementations, the mapping data 724 may comprise a set of values in a matrix form. These values may be generated based on an assumption that a plurality of pixels in the acquired image data 112 is associated with objects located within a common plane. For example, homography techniques may be used to generate the mapping data 724. The values in the matrix thus describe a relationship between points on the common plane such as the item plane 208 and points on the camera plane 204 of the sensor 108.

The sensor data 628 may also be stored in the data store 620. The sensor data 628 may include a sensor identifier 720 that comprises data indicative of a particular sensor 108, such as a certain camera 108(1), weight sensor 108(6), and so forth. The sensor identifier 720 may be unique in the context of a particular inventory location 102, aisle 410, facility 402, or globally across multiple facilities 402. The sensor data 628 may be generated or acquired by one or more of the sensors 108. The sensor data 628 may include one or more of the sensor identifiers 720, a timestamp 728, acquired image data 112, non-image sensor data 730, or other data 732. The timestamp 728 may comprise information indicative of a time when the sensor data 628 was acquired. For example, the timestamp 728 may be based at least in part on time data obtained from a clock onboard the sensor 108, by the clock 606 on the server 504, and so forth. The inventory management module 624 may use the timestamp 728 to determine the interaction data 416. For example, the timestamp 728 may be used to determine a sequence of the rectified image data 122, such as to determine the rectified image data 122 occurring before and after an interaction at the inventory location 102.

The sensor data 628 may be broadly categorized as comprising image-based sensor data and non-image sensor data 730. For example, the acquired image data 112 obtained from a camera 108(1) may be considered image-based sensor data, while weight data acquired from the weight sensor 108(6) may comprise non-image sensor data 730.

The sensor data 628 may include other data 732. For example, other data 732 may comprise information indicative of operational status of the sensor 108, error messages associated with the sensor 108, and so forth.

The inventory management module 624 may access one or more of the sensor data 628, the item data 116, the physical layout data 118, the perspective transformation data 120, the detection model data 128, and so forth, to determine the interaction data 416. The interaction data 416 may comprise one or more of an interaction type 734, an inventory location ID 710, an item identifier 702, quantity change data 736, and so forth.

The interaction type 734 may provide information about whether the interaction is determined to be a pick, place, touch, pick and place, and so forth. The inventory management module 624 may use the output data 130 to determine the interaction type 734.

As described above, inventory location ID 710 provides information about where the interaction took place. For example, the inventory location ID 710 may indicate a particular area on a particular shelf 104 on a particular rack in a particular aisle 410.

The item identifier 702 specifies the item 106 implicated by the interaction. For example, the item identifier 702 may indicate the item 106 that was picked or placed. In some implementations, the item identifier 702 may be determined at least in part by the output data 130.

The quantity change data 736 provides information indicative of a change in the quantity of the type of item 106 resulting from the interaction. For example, the quantity change data 736 may indicate a value of "−1" when a single item 106 is picked from the inventory location 102, or value of "+3" when three items 106 are placed to the inventory location 102.

The item data 116 may provide information about an individual item 106, while the interaction data 416 may comprise information about one or more of the items 106 that may be undergoing some change, such as movement from the inventory location 102 to the tote 414.

In one implementation, the inventory management module 624 may generate other information about the items 106 stowed at the inventory location 102. For example, the interaction data 416 may be analyzed to determine if a user 412 such as a person tasked with restocking the inventory location 102 is rotating stock such that old stock is brought to the front while new stock is placed behind. Continuing the example, the interaction data 416 may be based on output data 130 indicating which of the items 106 at a particular inventory location 102 were removed, such as those at the back of a column or the front of the column.

Illustrative Processes

Figure 8:
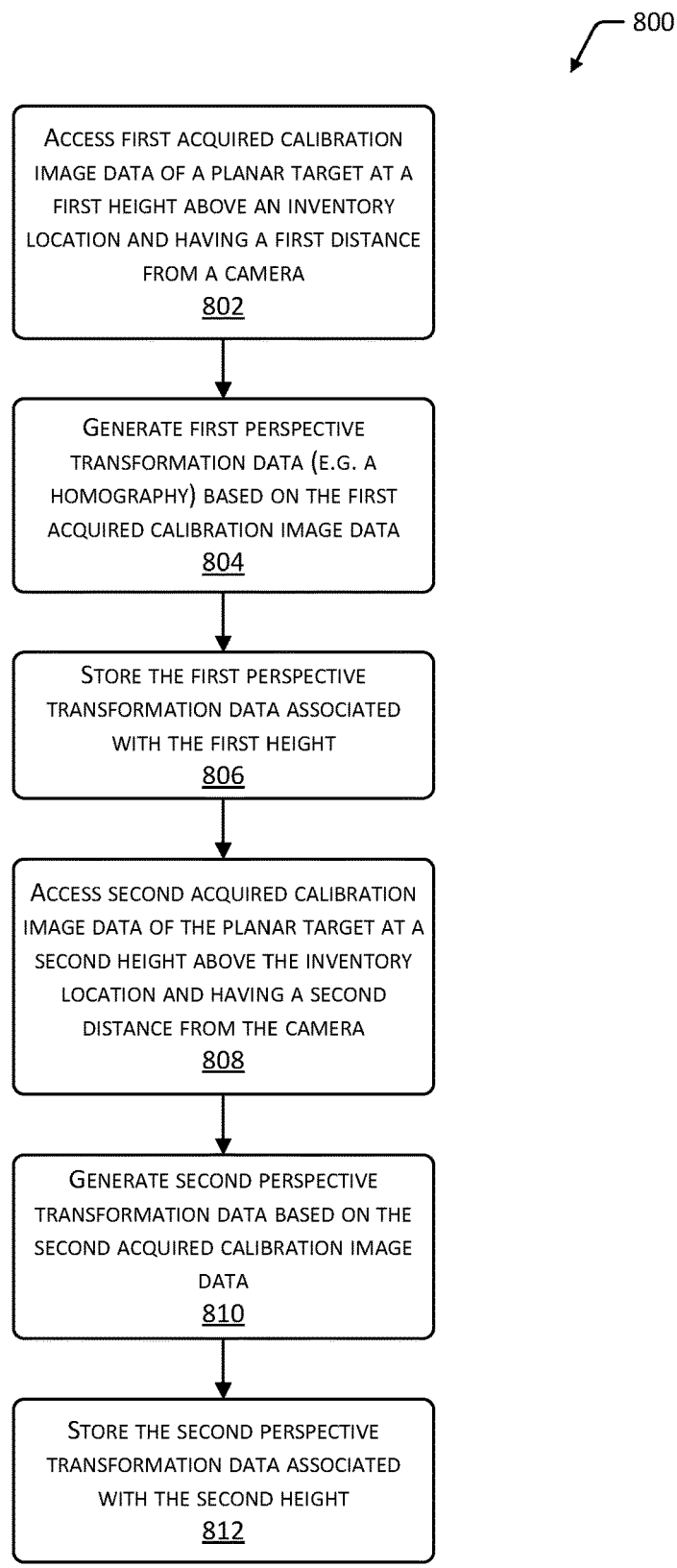
FIG. 8 depicts a flow diagram of a process for generating perspective transformation data for different heights using a planar target, according to some implementations.

FIG. 8 depicts a flow diagram 800 of a process for generating perspective transformation data 120 for different heights using a planar target, according to some implementations. The process may be implemented at least in part by the inventory management module 624. In different implementations, one or more of the blocks described below may be omitted, the sequence of the process using these blocks may vary from that depicted, and so forth.

In some implementations, prior to use by the inventory management module 624, a plurality of sets of perspective transformation data 120 may be generated. A particular set of perspective transformation data 120 may be generated for a particular combination of sensor position, sensor direction, and height of item plane 208. This particular set may subsequently be used where those same or similar conditions are identified. In one implementation, fixtures in the facility 402 such as shelving, camera mounting brackets, and so forth, may be of known size and are used with a known relative position of the sensor 108. In this implementation, the same set of perspective transformation data 120 may be used for many different inventory locations 102 having substantially the same configuration.

Block 802 accesses first acquired calibration image data of a planar target. In some implementations, the planar target may be maintained at a height that is within a threshold distance of the height of the type of item 106. For example, the planar target may comprise a preprinted panel with one or more fiducials that is placed atop the items 106 as they sit on the shelf 104. The camera 108(1) may obtain first acquired image data 112(1) that includes an image of the planar target. The planar target may be maintained at a first height above an inventory location 102, such as resting on the shelf 104, supported by the items 106, held in place by a support structure, and so forth. The height may be a known value. For example, the height may be determined based on the item data 116 by retrieving the height of a particular type of item 106. The planar target has a first distance from a camera 108(1). In other implementations, the acquired calibration image data may be of a target that is not planar.

Block 804 generates first perspective transformation data 120(1) based on the first acquired calibration image data. For example, the machine vision module 126 may be used to process the first acquired calibration image data to locate within the image, and determine coordinates of, pixels that correspond to the one or more fiducials that act as reference points in a common plane. Once these points have been identified, a first homography matrix may be generated to produce the first perspective transformation data 120(1).

Block 806 stores the first perspective transformation data 120(1). The first perspective transformation data 120(1) may be associated with the first height. The first perspective transformation data 120(1) may also be associated with the particular combination of the sensor position and sensor direction.

Block 808 accesses second acquired calibration image data of the planar target. The camera 108(1) may obtain second acquired image data 112(2) that includes an image of the planar target. The planar target may be maintained at a second height above an inventory location 102. The planar target has a second distance from the camera 108(1). As above, in other implementations, the acquired calibration image data may be of a target that is not planar.

Block 810 generates second perspective transformation data 120(2) based on the second acquired calibration image data. For example, the machine vision module 126 may be used to process the second acquired calibration image to locate within the image, and determine coordinates of, pixels that correspond to the one or more fiducials. Once these points have been identified, a second homography matrix may be generated to produce the second perspective transformation data 120(2).

Block 812 stores the second perspective transformation data 120(2). The second perspective transformation data 120(2) may be associated with the second height. The second perspective transformation data 120(2) may also be associated with the particular combination of the sensor position and sensor direction.

The process may continue to be iterated to build a library of perspective transformation data 120 for a variety of different heights. In one implementation, the image rectification module 114 may retrieve particular perspective transformation data 120 based on the height. In another implementation, the image rectification module 114 may produce a plurality of sets of rectified image data 122, each produced using different perspective transformation data 120. This is described in more detail below with regard to FIGS. 10 and 11.

Figure 9:
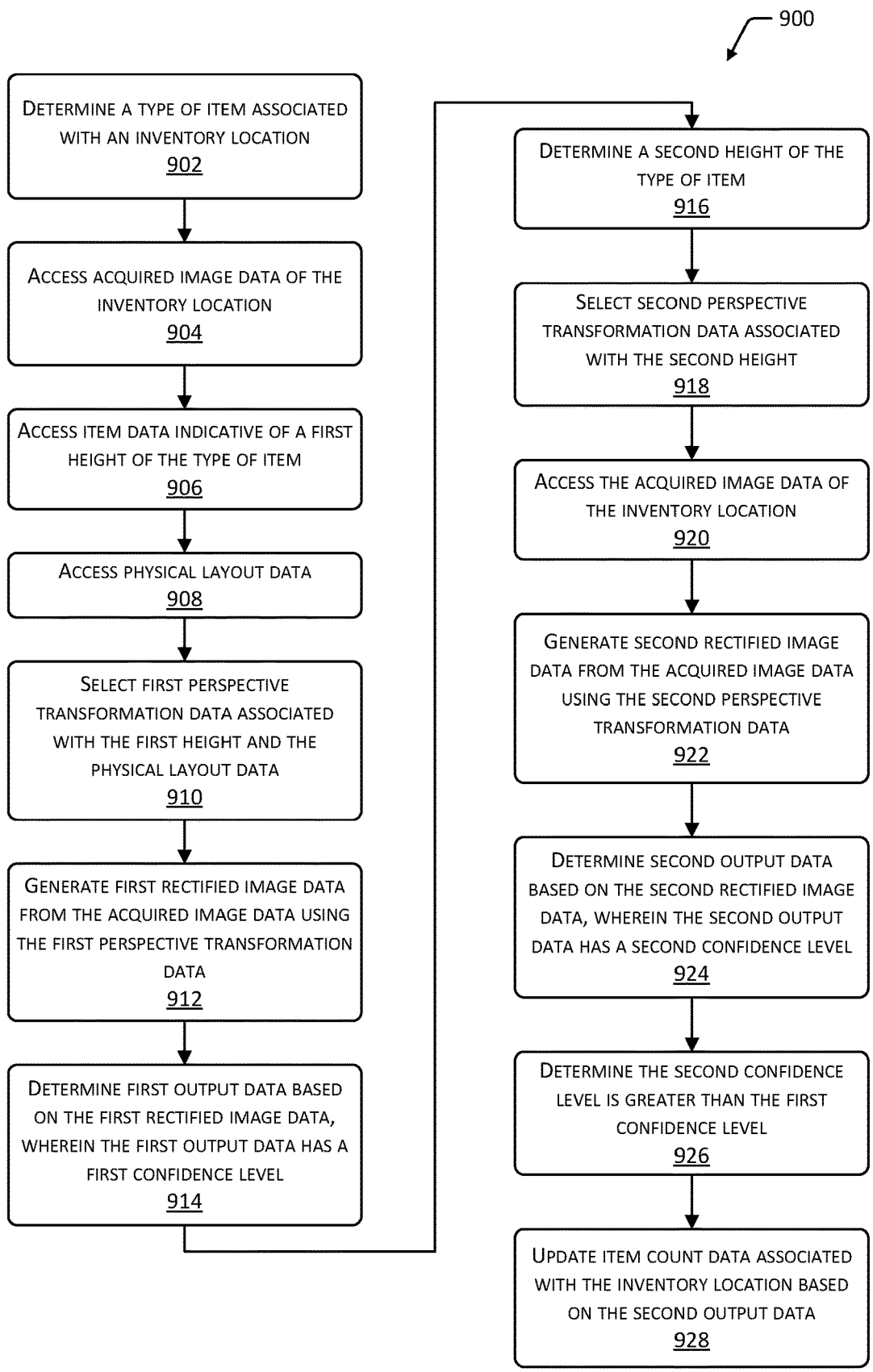
FIG. 9 depicts a flow diagram of a process for using a height of a type of item at an inventory location to generate rectified image data, according to some implementations.

FIG. 9 depicts a flow diagram 900 of a process for using a height of a type of item 106 at an inventory location 102 to generate rectified image data 122, according to some implementations. The process may be implemented at least in part by the inventory management module 624. In different implementations, one or more of the blocks described below may be omitted, the sequence of the process using these blocks may vary from that depicted, and so forth.

Block 902 determines a type of item 106 associated with an inventory location 102. For example, the item data 116 associated with a particular inventory location 102 may be accessed to determine the item identifier 702.

Block 904 accesses acquired image data 112. The acquired image data 112 may be obtained by the camera 108(1) viewing a particular inventory location 102. The acquired image data 112 may be representative of a foreshortened image of the particular inventory location 102. For example, the camera 108(1) viewing the particular inventory location 102 may have a centerline of a FOV 202 that is at an oblique angle relative to a plane of the particular inventory location 102. The acquired image data 112 may be representative of a two-dimensional array of pixels. Each pixel has a value and is associated with a set of coordinates within the array.

Block 906 accesses item data 116 indicative of a first height of the type of item 106. For example, based on the item identifier 702, the geometry data 704 including height information of the item 106 may be retrieved. In some implementations, the height may be for an item plane 208 associated with the inventory location 102. The height may be relative to the inventory location 102, such as measured from a shelf 104 upon which the item 106 is resting.

Block 908 accesses physical layout data 118. As described above, the physical layout data 118 may be indicative of one or more of a position of the camera 108(1) with respect to the inventory location 102 or a pose of the camera 108(1) with respect to the inventory location 102. For example, the physical layout data 118 may associate the particular camera 108(1) with the particular inventory location 102 or portion thereof.

Block 910 selects first perspective transformation data 120(1). In one implementation, the perspective transformation data 120 may be selected based on the height Z1 of the type of item 106 and the physical layout data 118. As described above, the perspective transformation data 120 associates a first set of two-dimensional coordinates in a camera plane 204 to a second set of two-dimensional coordinates in a virtual camera plane 206. For example, the perspective transformation data 120 may include mapping data 724 comprising a transformation matrix generated using a homography. The virtual camera plane 206 may be parallel to a plane of the inventory location 102, shelf 104, and so forth.

Block 912 generates first rectified image data 122(1) by using the perspective transformation data 120 to map the values for the pixels at the first set of two-dimensional coordinates in the acquired image data 112 to the second set of two-dimensional coordinates. In one implementation, first rectified image data 122(1) may be generated using the first perspective transformation data 120(1) that is selected based on a first height of the type of item 106.

A portion of the rectified image data 122 that corresponds to points at the height selected may appear to have been obtained by the virtual camera 124. As illustrated above with regard to FIG. 2, the virtual camera 124 may be considered to be positioned above the inventory location 102 with a centerline of a FOV 202 that is orthogonal to the inventory location plane 210 and is looking towards the inventory location 102.

Block 914 determines first output data 130(1) based at least in part of the first rectified image data 122(1). For example, the machine vision module 126 may access the detection model data 128 associated with the item identifier 702 for that inventory location 102. The machine vision module 126 may use the detection model data 128 to determine one or more of item count data 132, item identification data 134, and so forth. In some implementations, the output data 130 may have a confidence level. The confidence level may comprise a metric or value that is indicative of a probability that the output data 130 is correct. In some implementations, the confidence level may be based at least in part on a variance between a height of a type of item 106 and the height of the item plane 208 that corresponded to the perspective transformation data 120 available. For example, the item height 106 may be 80 mm while the closest available perspective transformation data 120 may be for a height of 100 mm. Continuing the example above, the first output data 130(1) may be determined based on the first rectified image data 122(1), and the first output data 130(1) may have a first confidence level.

As described above, the output data 130 may comprise one or more of item count data 132, item identification data 134, and so forth. For example, the item count data 132 may be determined by recognizing the contours of individual items 106 in the rectified image data 122 and counting the number of contours. In another example, the item identification data 134 may be determined by accessing geometry data 704 indicative of a predetermined size of a particular polygon associated with a type of item 106. For example, the geometry data 704 may indicate that the type of item 106 when viewed from above appears to be circular and has a diameter of 300 pixels. Continuing the example, different types of items 106 may have different sizes, such as different types of cans of pet food may have different diameters. A size of the type of item 106 depicted in the rectified image data 122 may be determined, such as a diameter of a circle, width of a rectangle, and so forth. Based on the determined size of the type of item 106 in the rectified image data 122 being within a threshold value of the predetermined size indicated by the geometry data 704, the type of the item 106 may be identified.

In other implementations, the process may be used to designate a particular item 106 is not being in a particular type of item 106. For example, a small can having a diameter of 20 mm that has been inadvertently placed at the shelf 104 of pet food cans having a diameter of 60 mm may be disregarded for purposes of counting.

Block 916 determines a second height of the type of item 106. For example, the second height may comprise a multiple of the height of a single item 106. Continuing the example, where the height of an individual item 106 is 85 mm, the multiple may be 170 mm, 255 mm, and so forth. In some implementations, the second height may not be an integer multiple of the height. For example, the multiplier may be 0.9 to 1.1.

Block 918 selects second perspective transformation data 120(2) associated with the second height. In some implementations, the second perspective transformation data 120(2) may be selected that corresponds to an item plane 208 that has a height within a threshold tolerance of the second height.

Block 920 accesses the acquired image data 112 of the inventory location 102. This may be the same acquired image data 112 previously processed by the image rectification module 114 using the first perspective transformation data 120(1).

Block 922 generates second rectified image data 122(2) from the acquired image data 112 using the second perspective transformation data 120(2).

Block 924 determines second output data 130(2) based on the second rectified image data 122(2). The second output data 130(2) may have a second confidence level.

Block 926 determines the second confidence level is greater than the first confidence level. For example, a portion of the first rectified image data 122(1) may have been occluded by a hand of the user 412, and as a result decreases the value of the first confidence level.

Block 928 updates item count data 132 based at least in part on the second output data 130(2). For example, the quantity data 712 for the inventory location 102 may be updated based at least in part on the item count data 132.

Figure 10:
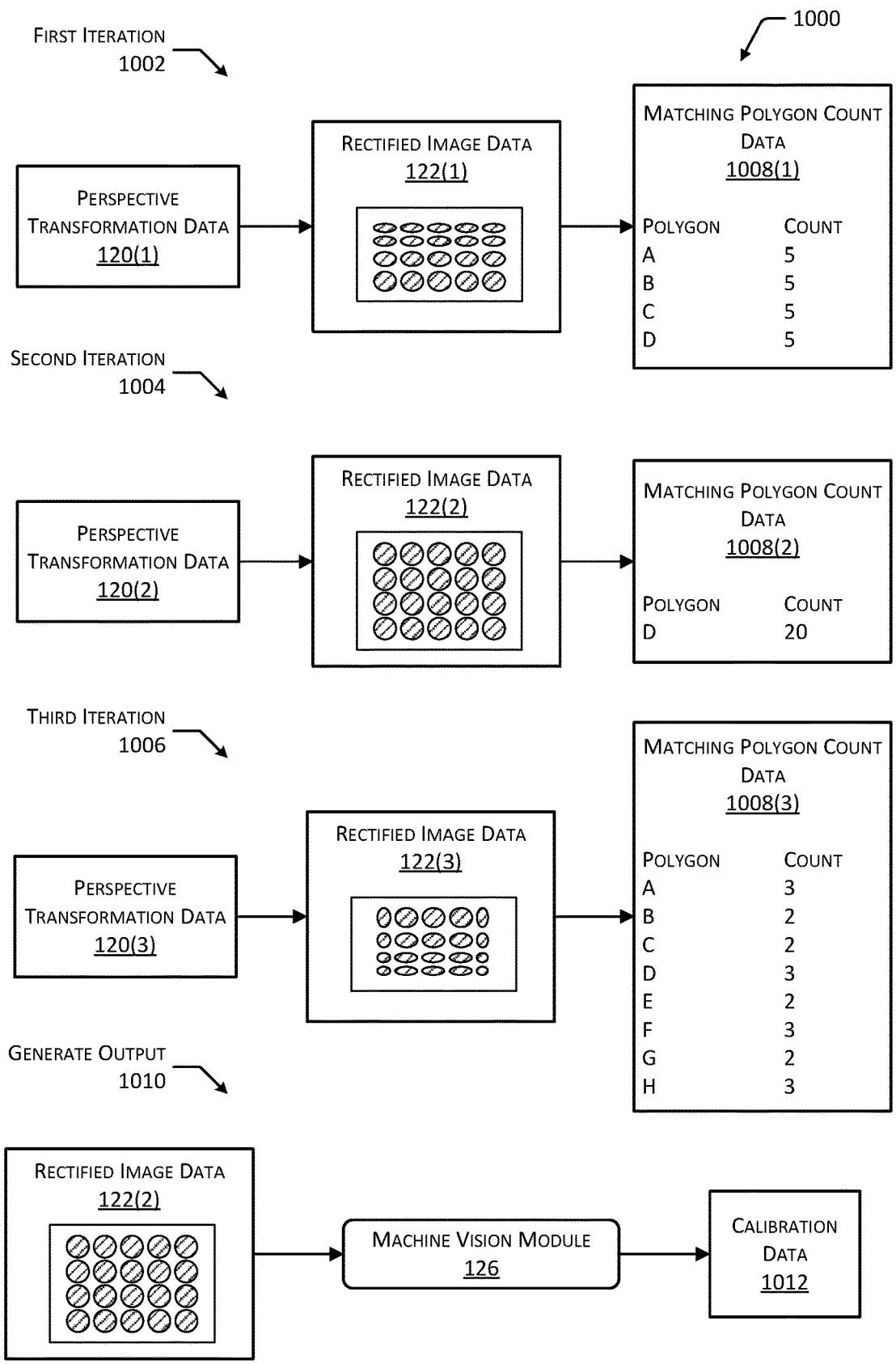
FIG. 10 depicts a scenario for generating calibration data using perspective transformation data based on a polygon count of rectified image data, according to some implementations.

FIG. 10 depicts a scenario 1000 for generating calibration data using perspective transformation data 120, according to some implementations. As described above, when the perspective transformation data 120 has been selected that accurately represents an overhead view as apparently taken by the virtual camera 124, the plurality of the same type of item 106 that appear in the rectified image data 122 have substantially the same scale. As a result, the same types of item 106 have the same apparent size within the rectified image data 122. For example, the apparent size of different items 106 of the same type may vary by less than 5%. Furthermore, the measured apparent size of items 106 may be compared with previously stored item data 116. Using the scales, as described above, the pixel size may be compared with the item data 116 indicative of actual dimensions to determine if the perspective transformation data 120 has been properly selected. For example, when the apparent size of the items 106 that appear in the rectified image data 122 correspond to the actual size of the item 106 as specified in the item data 116, the correct perspective transformation data 120 may be deemed to have been selected. In some implementations, the apparent size of the items 106 may be determined by using an edge detection algorithm to determine edges of the item 106, and then counting the pixels from one edge to another.

When the perspective transformation data 120 incorrectly maps the acquired image data 112 to produce erroneous rectified image data 122, various distortions in the rectified image data 122 are present. For example, if the image rectification module 114 incorrectly selects particular perspective transformation data 120 that uses a homography based on an item plane 208 that is at a non-zero angle relative to the actual item plane 208 of the tops of the items 106, some of the tops of the items 106 will appear to be distorted. Continuing the example, the tops of the cans of pet food may appear elliptical rather than circular if the item plane 208 for the homography is different from that of the actual item plane 208.

In the implementation depicted in FIG. 10, different sets of perspective transformation data 120 may be tested to determine a best one of the perspective transformation data 120 to utilize, independent of height data.

A first iteration 1002, second iteration 1004, and third iteration 1006 are depicted here. While three iterations are depicted, a greater or lesser number of iterations may be utilized.

The first iteration 1002 depicts first perspective transformation data 120(1) being used by the image rectification module 114 to generate first rectified image data 122(1). As depicted in the illustration, the first rectified image data 122(1) exhibits some distortion due to perspective effects. The machine vision module 126 may be used to process the first rectified image data 122(1) and determine the polygons that appear within. The polygons that have substantially similar sizes may be grouped together, and a count for each of these groups may be made to generate matching polygon count data 1008. For example, with the first iteration 1002, first matching polygon count data 1008(1) indicates four groups of polygons, with each group having a count of five items.

Each of the iterations may utilize different perspective transformation data 120. In one implementation, the iterations may step through those perspective transformation data 120 associated with heights sequentially. For example, the first iteration 1002 may utilize the perspective transformation data 120 associated with a height Z1 of 80 mm, while the second iteration 1004 may utilize the perspective transformation data 120 associated with a multiple of the height Z1, and so forth.

As illustrated in the second iteration 1004, the second perspective transformation data 120(2) results in a second rectified image data 122(2) that depicts the tops of the items 106 relatively free from distortion. As a result, the machine vision module 126 generates second matching polygon count data 1008(2) that indicates a single group having 20 items in it.

The third iteration 1006 using the third perspective transformation data 120(3) results in a third rectified image data 122(3) that is distorted. As a result, the machine vision module 126 generates third matching polygon count data 1008(3) that indicates eight different types of polygons with counts for each.

At 1010, the system may generate output such as calibration data 1012. The image rectification module 114, or another module, may analyze the second matching polygon count data 1008(2) to determine the second rectified image data 122(2) to use for subsequent processing by the machine vision module 126. For example, the image rectification module 114 may designate as the best fit the perspective transformation data 120 that produces the smallest number of polygon groups. Continuing the example depicted here, the best fit is the second perspective transformation data 120(2). The second perspective transformation data 120(2) may then be used by the machine vision module 126 to generate calibration data 1012, determine output data 130, and so forth.

The image rectification module 114, or another module, may store the generated calibration data 1012 that associates the perspective transformation data 120 having a best fit with a particular inventory location 102 for later use. In some implementations, the selection of the best fit perspective transformation data 120 may be used to determine the height of the items 106, angle of the item plane 208 as it exists, camera calibration parameters, and so forth. For example, the perspective transformation data 120 may include an association with a particular angle of an item plane 208. By knowing the particular perspective transformation data 120, the associated angle of the item plane 208 may be retrieved.

Figure 11:
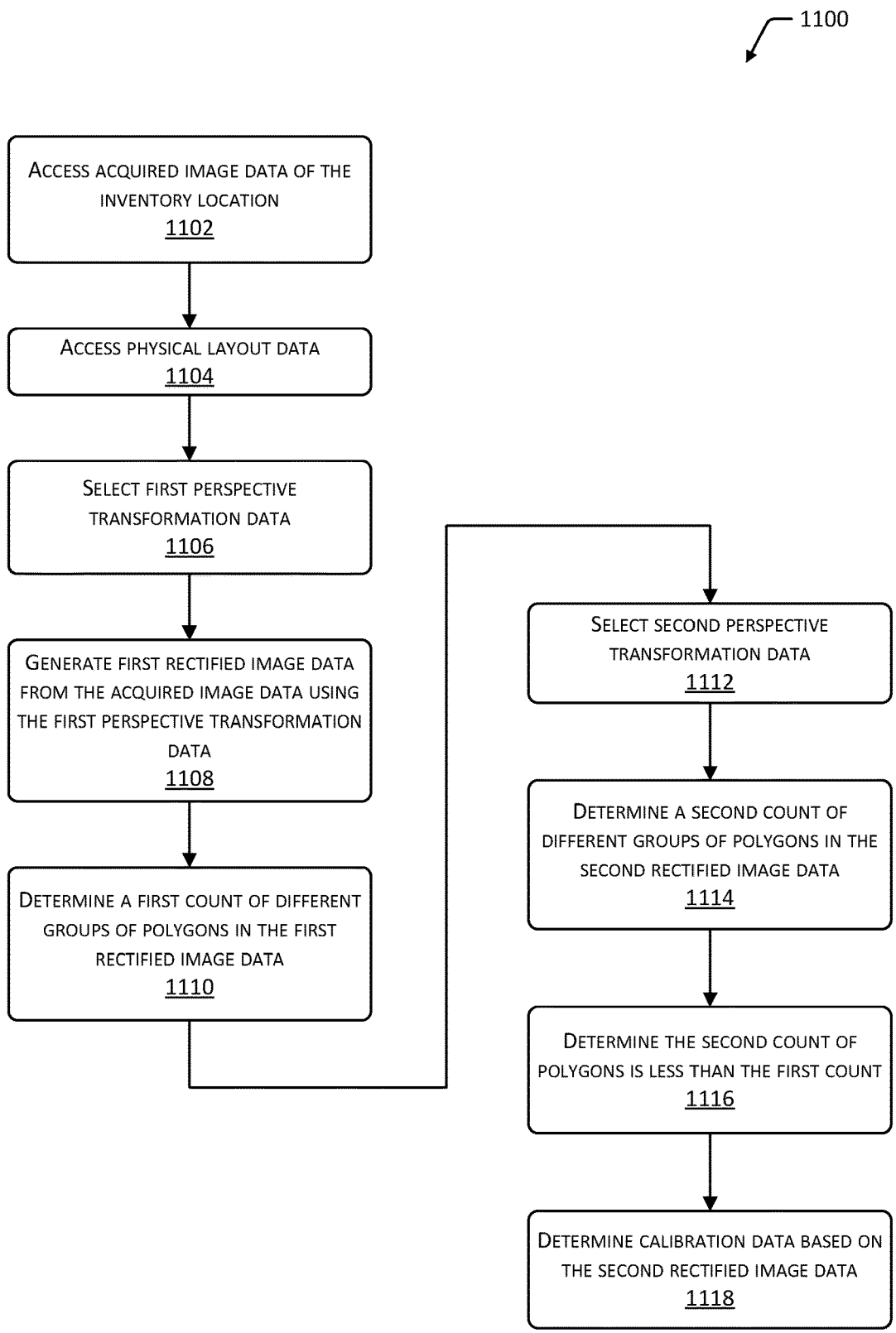
FIG. 11 depicts a flow diagram of a process for generating calibration data using perspective transformation data, according to some implementations.

FIG. 11 depicts a flow diagram 1100 of another process for generating calibration data 1012 using perspective transformation data 120, according to some implementations. The process may be implemented at least in part by the inventory management module 624. In different implementations, one or more of the blocks described below may be omitted, the sequence of the process using these blocks may vary from that depicted, and so forth.

Block 1102 accesses acquired image data 112. As described above, in some implementations, the acquired image data 112 may be a foreshortened image of an inventory location 102.

Block 1104 accesses physical layout data 118. The physical layout data 118 may be indicative of one or more of a relative position of a camera 108(1) with respect to the inventory location 102 or another reference point, a pose of the camera 108(1) with respect to the inventory location 102 or another reference point, and so forth.

Block 1106 selects first perspective transformation data 120(1). The first perspective transformation data 120(1) is associated with the physical layout data 118 corresponding to the particular inventory location 102. The first perspective transformation data 120(1) may be associated with one or more of a first height, a first angle of an item plane 208 with respect to the inventory location plane 210, and so forth. In some implementations, the first height may be a minimum height (such as the inventory location plane 210) or a maximum height for which perspective transformation data 120 is available. In some implementations, the item plane 208 may be at an angle to the inventory location plane 210, such as when a ramp or terrace is used to stow products at the inventory location 102.

Block 1108 generates first rectified image data 122(1) from the acquired image data 112 using the first perspective transformation data 120(1).

Block 1110 determines a first count of different groups of polygons in the first rectified image data 122(1). Each group may comprise polygons that are within a first threshold value of the same size and shape as one another. For example, the polygons may be grouped according to size.

Block 1112 selects second perspective transformation data 120(2). The second perspective transformation data 120(2) may be associated with the physical layout data 118 corresponding to the particular inventory location 102. The second perspective transformation data 120(2) may also be associated with one or more of a second height, a second angle of the item plane 208 with respect to the inventory location plane 210, and so forth.

Block 1114 determines a second count of different groups of polygons in the second rectified image data 122(2). Each group may comprise polygons that are within a second threshold value of the same size and shape as one another. As above, polygons may be grouped according to size and then a count determined for the polygons within each group.

Block 1116 determines the second count is less than the first count of polygons. Block 1118 determines calibration data 1012 based on the second rectified image data 122(2). The calibration data 1012 may be used to determine a particular item plane 208 that is associated with particular perspective transformation data 120. The calibration data 1012 may then be used to select the particular perspective transformation data 120 for the generation of rectified image data 122.

In some implementations, the calibration data 1012 may include data indicative of an association between the particular inventory location 102 and the second perspective transformation data 120(2). The calibration data 1012 may be used during subsequent operations by the inventory management module 624. For example, second acquired image data 112(2) acquired at a later time may be processed using the second perspective transformation data 120(2), without performing the multiple iterations described herein. As a result, the utilization of computational resources may be reduced and the overall speed of execution for the process may be improved during subsequent runs.

Returning to the example depicted above with regard to FIG. 10, the second rectified image data 122(2) has second matching polygon count data 1008(2) indicative of a single group. In comparison, the first rectified image data 122(1) has first matching polygon count data 1008(1) that is indicative of four different groups of polygons. Based on the assumption that the inventory location 102 is tidy, or has less than a threshold number of foreign objects within the FOV 202, the rectified image data 122 corresponding to the minimum number of different polygons may be deemed to be the most accurate virtual representation of the acquired image data 112.

The process described above with regard to FIG. 9 may be used in conjunction with the process described in FIG. 11. For example, the item data 116 and the physical layout data 118 may be used to determine a height Z1 of one or more of the type of item 106 or an angle of the item plane 208 expected to be at the inventory location 102. This height or angle of the item plane 208 may be used to select the first perspective transformation data 120(1). The additional iterations may utilize perspective transformation data 120 that are associated with different heights above and below that specified by height Z1, angles of the item plane 208 relative to the inventory location plane 210, or a combination thereof. For example, the additional iterations may generate rectified image data 122 using perspective transformation data 120 at Z1 minus 5 mm, plus 5 mm, plus 5 degrees, minus 5 degrees, and so forth. If the perspective transformation data 120 that results in the minimum number of groups of different polygons corresponds to the height Z1 and a particular angle, the output data 130 resulting from subsequent rectified image data 122 may be deemed to be highly reliable.

As described above, in some implementations, the perspective transformation data 120 may be generated using a planar target, manual input from a human operator, calculation based on previously known information, and so forth.

The process described in FIG. 11 does utilize computational resources to generate multiple iterations of the rectified image data 122. However, this iterative process may use substantially fewer computational resources than those associated with traditional techniques to recognize items 106 of different scales within unprocessed acquired image data 112. As a result, the process depicted in FIG. 11 may utilize significantly fewer computational resources than those associated with traditional techniques for processing image data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a shelf to hold a plurality of a type of item;
   a camera positioned above the shelf and having a field-of-view that includes at least a portion of the shelf; and
   a computing device comprising:
     a memory, storing computer-executable instructions; and
     a hardware processor to execute the computer-executable instructions to:
       access image data representative of a foreshortened image of tops of the plurality of the type of item at the shelf;
       determine transformation data associated with an inventory location, the transformation data associating a plurality of reference points in a common plane and a plurality of alternate points in a virtual camera plane;
       generate first transformed image data from the image data using the transformation data, the first transformed image data representing the tops of the plurality of the type of item with similar apparent sizes;
       identify the plurality of the type of item in the first transformed image data; and determine item count data indicative of a quantity of the plurality of the type of item in the first transformed image data.

2. The system of claim 1, the hardware processor to further execute the computer-executable instructions to:
calculate the transformation data based on one or more of:
size information associated with physical dimensions of the shelf, layout information associated with a layout of the shelf and the camera,
parameter information associated with one or more parameters of the camera,
configuration information associated with a configuration of the camera, or
calibration data associated with the plurality of the type of item.

3. The system of claim 1, the hardware processor to further execute the computer-executable instructions to:
access item data associated with the plurality of the type of item;
determine at least one height associated with the plurality of the type of item; and
wherein the determination of the transformation data is based on calibration data that is related to the at least one height associated with the plurality of the type of item.

4. A system comprising:
a memory, storing computer-executable instructions; and
a hardware processor to execute the computer-executable instructions to:
access image data representative of a foreshortened image of a plurality of a type of item at an inventory location;
determine transformation data associated with the inventory location, the transformation data associating a plurality of reference points in a common plane and a plurality of alternate points in a virtual camera plane;
generate first transformed image data from the image data using the transformation data, the first transformed image data representing the plurality of the type of item with sizes that are similar within a given threshold; and
generate first output data using the first transformed image data.

5. The system of claim 4, the hardware processor to further execute the computer-executable instructions to:
calculate the transformation data based on facility information or calibration data.

6. The system of claim 5, wherein the facility information comprises at least one or more of:
size information associated with one or more physical dimensions of the inventory location,
layout information associated with a layout of at least one or more of a shelf and one or more sensors at the inventory location,
parameter information related to one or more parameters of the one or more sensors, or
configuration information associated with the one or more sensors; and
wherein the calibration data is associated with at least the plurality of the type of item at the inventory location.

7. The system of claim 4, the hardware processor to further execute the computer-executable instructions to:
calculate the transformation data based on a planar target temporarily placed at a known height above the inventory location; and
wherein the transformation data is determined based on the known height corresponding to a height of the plurality of the type of item at the inventory location.

8. The system of claim 4, the hardware processor to further execute the computer-executable instructions to:
generate first calibration data for a first known height above the inventory location;
generate second calibration data for a second known height above the inventory location; and
wherein the transformation data is determined based at least on one or more of:
the first calibration data, or
the second calibration data.

9. The system of claim 4, wherein:
the first output data comprises one or more of:
item count data, the item count data comprising information indicative of a quantity of the plurality of the type of item at the inventory location, or
item identification data, the item identification data comprising information indicative of the plurality of the type of item at the inventory location.

10. The system of claim 4, the hardware processor to further execute the computer-executable instructions to:
determine a count of the plurality of the type of item in the first transformed image data using a convolutional neural network that detects individual items in the first transformed image data; and
wherein the generation of the first output data uses the count of the plurality of the type of item.

11. The system of claim 4, the hardware processor to further execute the computer-executable instructions to:
determine one or more features of the plurality of the type of item in the first transformed image data using a histogram of oriented gradients algorithm;
classify the one or more features of the plurality of the type of item using a support vector machine;
determine a count of the plurality of the type of item in the first transformed image data; and
wherein the generation of the first output data uses the count of the plurality of the type of item.

12. The system of claim 4, the hardware processor to further execute the comprising computer-executable instructions to:
generate interaction data at the inventory location using the first output data.

13. A method comprising:
accessing image data representative of a plurality of a type of item at an inventory location;
identifying the plurality of the type of item at the inventory location;
determining transformation data associated with the inventory location, the transformation data associating a plurality of reference points in a common plane and a plurality of alternate points in a virtual camera plane;
generating first transformed image data from the image data using the transformation data, the first transformed image data representing the plurality of the type of item with sizes that vary less than a given threshold; and
generating first output data using the first transformed image data.

14. The method of claim 13, further comprising:
calculating the transformation data using one or more of:
size information associated with one or more physical dimensions of a shelf at the inventory location,
layout information associated with a layout of at least one or more of the shelf or one or more sensors at the inventory location, parameter information related to one or more parameters of the one or more sensors,
configuration information associated with the one or more sensors, or
calibration data associated with the plurality of the type of item at the inventory location.

15. The method of claim 13, further comprising:
calculating the transformation data based on a planar target temporarily placed at a known height above the inventory location; and
wherein a height of the plurality of the type of item corresponds to the known height.

16. The method of claim 13, further comprising:
generating first calibration data for a first known height for the inventory location;
generating second calibration data for a second known height for the inventory location; and
wherein the transformation data is determined based on one or more of:
the first calibration data, or
the second calibration data.

17. The method of claim 13, wherein:
the first output data comprises one or more of:
item count data, the item count data comprising information indicative of a quantity of the plurality of the type of item at the inventory location, or
item identification data, the item identification data comprising information indicative of the plurality of the type of item at the inventory location.

18. The method of claim 13, further comprising:
determining a count of the plurality of the type of item in the first transformed image data using a convolutional neural network that detects individual items in the first transformed image data; and
wherein the generating the first output data uses the count of the plurality of the type of item.

19. The method of claim 13, further comprising:
determining one or more features of the plurality of the type of item in the first transformed image data using a histogram of oriented gradients algorithm;
classifying the one or more features of the plurality of the type of item using a support vector machine;
determining a count of the plurality of the type of item in the first transformed image data; and
wherein the generating the first output data uses the count of the plurality of the type of item.

20. The method of claim 13, further comprising:
generating interaction data at the inventory location using the first output data.

\* \* \* \* \*